(12) United States Patent
Ogasawara

(10) Patent No.: US 10,663,715 B2
(45) Date of Patent: May 26, 2020

(54) ENDOSCOPIC APPARATUS, CONTROL METHOD OF ENDOSCOPIC APPARATUS, AND NON-TRANSITORY COMPUTER-READABLE RECORDING MEDIUM STORING PROGRAM

(71) Applicant: OLYMPUS CORPORATION, Tokyo (JP)

(72) Inventor: Masamitsu Ogasawara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/268,586

(22) Filed: Feb. 6, 2019

(65) Prior Publication Data
US 2019/0243122 A1    Aug. 8, 2019

(30) Foreign Application Priority Data
Feb. 7, 2018  (JP) ................................ 2018-020396

(51) Int. Cl.
G02B 23/24 (2006.01)
H04N 13/211 (2018.01)
H04N 13/296 (2018.01)

(52) U.S. Cl.
CPC ....... *G02B 23/243* (2013.01); *G02B 23/2484* (2013.01); *H04N 13/211* (2018.05); *H04N 13/296* (2018.05); *H04N 2213/001* (2013.01)

(58) Field of Classification Search
CPC .............. G02B 23/243; G02B 23/2484; H04N 13/296; H04N 13/211; H04N 2213/001
USPC ......................................................... 348/45
See application file for complete search history.

(56) References Cited

U.S. PATENT DOCUMENTS

2010/0208046 A1* 8/2010 Takahashi .......... A61B 1/00193
348/65

FOREIGN PATENT DOCUMENTS

JP        2010128354 A        6/2010

* cited by examiner

*Primary Examiner* — Nam D Pham
(74) *Attorney, Agent, or Firm* — Scully, Scott, Murphy & Presser, P.C.

(57) ABSTRACT

This endoscopic apparatus has an insertion portion having a distal end portion; a first/second objective optical systems disposed in the distal endportion to forma first/second objective image of an object on an imaging region by transmitting light from the object through a first/second optical path; an optical path switching means configured to switch an optical path of the light from the object to either of the first optical path or the second optical path such that either of the first objective image or the second objective image is formed on the imaging region; an image sensor for capturing the first/second objective image; and an optical path switching controller for controlling the optical path switching means to switch the optical paths.

18 Claims, 8 Drawing Sheets

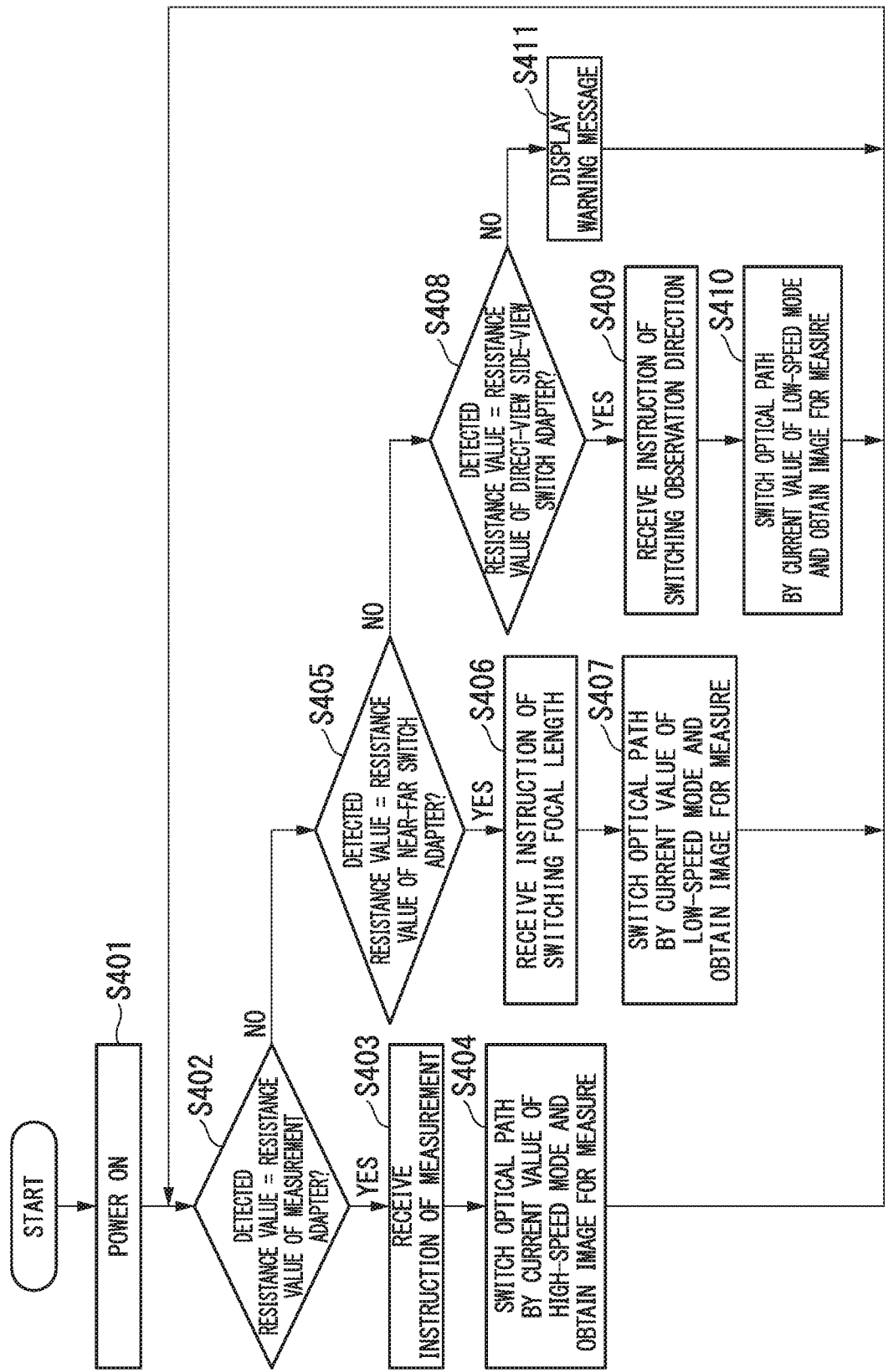

ENDOSCOPIC APPARATUS, CONTROL METHOD OF ENDOSCOPIC APPARATUS, AND NON-TRANSITORY COMPUTER-READABLE RECORDING MEDIUM STORING PROGRAM

BACKGROUND OF THE INVENTION

Field of the Invention

The present invention relates to an endoscopic apparatus, a control method of an endoscopic apparatus, and a non-transitory computer-readable recording medium storing a program. Priority is claimed on a Japanese Patent Application No. 2018-020396, filed on Feb. 7, 2018. The content of the Japanese patent application is incorporated herein by reference.

In a medical field or an industrial field, an endoscopic apparatus having an elongated insertion portion inserted into a specimen and configured to capture an image of a subject inside the specimen by an image sensor provided inside a distal end portion positioned at a distal end side of the insertion portion is widely used. For example, in the medical field, a medical endoscopic apparatus is used in order to observe organs inside a body cavity by inserting the insertion portion into the body cavity, and to perform various treatments using treatment tools inserted into a treatment tool channel as necessary. For example, in the industrial field, an industrial endoscopic apparatus is used in order to observe and inspect corrosion, crack and the like inside a boiler, a turbine, an engine, and a chemical plant.

For example, in an aircraft engine, a high pressure turbine blade is a component in which cracks and the like due to thermal shock easily occur since the blade is blown by high pressure and high temperature combustion air. Damage due to cracks generated in the blade critically impacts the aircraft engine. Accordingly, examination and inspection of the high pressure turbine blade using the industrial endoscopic apparatus is one of the most important items during a maintenance of the aircraft engine. In the inspection during the maintenance of the aircraft engine, the shape of the crack is measured and a judgement regarding whether the blade should be exchanged is performed according to a measurement result thereof.

In the inspection using the industrial endoscopic apparatus, it is possible that the measurement is performed by the endoscopic apparatus having two optical systems disposed in the distal end portion thereof. More specifically, in the inspection using the industrial endoscopic apparatus, it is possible to perform the measurement at two optical magnifications by a wide-angle optical system and a telescope optical system. The industrial endoscopic apparatus having two optical systems disposed in the distal end portion is configured to form images corresponding to object images by the image sensors respectively, wherein the object images are obtained by the optical systems having corresponding objective lens respectively. In this situation, supposing that the industrial endoscopic apparatus is configured to form the image corresponding to the objective image obtained by one of the objective lens using an image sensor corresponding to the objective lens and the image corresponding to the objective image obtained by the other objective lens using another image sensor corresponding to the other objective lens, that is, using two image sensors, it is difficult to make the distal end portion of the industrial endoscopic apparatus to be thin. Accordingly, it is considerable to form the images of the objective images obtained by the two objective lens using a single image sensor. However, in such a configuration, since an imaging region of the single image sensor is divided to form the image of the objective image obtained by one of the objective lens and the image of the objective image obtained by the other objective lens, resolutions of the images are deteriorated to lead to a deterioration of a measuring precision of the industrial endoscopic apparatus.

In Japanese Unexamined Patent Application, First Publication No. 2010/128354, the configuration of an endoscopic apparatus having two optical systems disposed inside the distal end portion thereof is proposed. The endoscopic apparatus disclosed in Japanese Unexamined Patent Application, First Publication No. 2010/128354 is an endoscopic apparatus configured to form an object image corresponding to the right eye which is obtained by an optical system having an objective lens at one side and an object image corresponding to the left eye which is obtained by another optical system having the objective lens at the other side, on a single image sensor, and to perform a stereo measurement based on a three-dimensional image formed utilizing a parallax of the object images. The endoscopic apparatus is configured to improve the measuring precision of the stereo measurement by increasing the resolutions of each of the object images while being configured to form both of the objective images equivalent to images captured by the right eye and the left eye respectively on the single image sensor. The endoscopic apparatus has a time-division optical path switching means for time-division shielding light from one optical path between the optical paths of the two optical systems so as to make only the light from the other optical path is incident on the single image sensor. According to this configuration of the endoscopic apparatus, the light from the optical path which is not shielded can form the image on whole of the imaging region of the single image sensor to increase the resolution.

Furthermore, in the endoscopic apparatus, it is possible to perform the stereo measurement by making the light from the optical paths of the two optical systems to be alternately incident on the single image sensor to form the objective images obtained by each of the optical systems. Thus, the endoscopic apparatus can improve the measuring precision at the time of measuring the object inside the specimens by increasing the resolutions of the images equivalent to the images captured by the left and right eyes respectively obtained for performing the stereo measurement.

However, in the industrial endoscopic apparatus, it is necessary to provide an element configured to alternately shield the optical paths as the time-division optical path switching means for switching between the optical paths of the two optical systems at the distal endportion thereof. In Japanese Unexamined Patent Application, First Publication No. 2010/128354, a configuration of rotating a shielding member around an axis to shield the light from either of the optical paths as the time-division optical path switching means is disclosed. That is, a mechanical mechanism configured to physically move the shielding member is disclosed in Japanese Unexamined Patent Application, First Publication No. 2010/128354.

SUMMARY OF THE INVENTION

According to a first aspect of the present invention, an endoscopic apparatus has an insertion portion configured to extend in a longitudinal direction and having a distal endportion; a first objective optical system disposed in the distal endportion and configured to form a first objective image of an object on an imaging region by transmitting light from the object through a first optical path; a second objective optical system disposed in the distal end portion and configured to form a second objective image of the object on the imaging region by transmitting the light from the object through a second optical path; an optical path switching means configured to switch an optical path of the light from the object to either of the first optical path or the second optical path such that either of the first objective image or the second objective image is formed on the imaging region; an image sensor configured to capture the first objective image and the second objective image formed on the imaging region; and an optical path switching controller configured to control the optical path switching means to switch the optical paths of the light from the object according to a state of the insertion portion.

According to a second aspect of the present invention, in the endoscopic apparatus according to the first aspect, the optical path switching controller may be configured to determine whether to switch the optical paths according to the state of the insertion portion, the optical path switching controller may be configured to control the optical path switching means to switch the optical paths when the optical path switching controller determines to switch the optical paths, and the optical path switching controller may be configured to control the optical path switching means not to switch the optical paths when the optical path switching controller determines not to switch the optical paths.

According to a third aspect of the present invention, in the endoscopic apparatus according to the second aspect, the optical path switching controller may be configured to generate and output an optical-path-switch driving signal to the optical path switching means when the optical path switching controller determines to switch the optical paths, the optical-path-switch driving signal being used for driving the optical path switching means to switch the optical paths, and the optical path switching controller may be configured to not output the optical-path-switch driving signal when the optical path switching controller determines that the optical paths cannot be switched.

According to a fourth aspect of the present invention, in the endoscopic apparatus according to the third aspect, the insertion portion may further have an information prompting means configured to prompt (display) information indicating the state of the insertion portion, and the optical path switching controller may be configured to determine whether to switch the optical paths according to the information prompted by the information prompting means.

According to a fifth aspect of the present invention, in the endoscopic apparatus according to the fourth aspect, the information prompting means may be a measuring means configured to prompt measurement information acquired by measuring the state of the insertion portion.

According to a sixth aspect of the present invention, in the endoscopic apparatus according to the fifth aspect, the measuring means may be configured to prompt the measurement information by measuring a temperature of the distal end portion of the insertion portion, and the optical path switching controller may be configured to: determine to switch the optical paths when the temperature of the distal end portion indicated by the measurement information is lower than a predetermined temperature threshold value, and determine not to switch the optical paths when the temperature of the distal end portion indicated by the measurement information is equal to or higher than the temperature threshold value.

According to a seventh aspect of the present invention, in the endoscopic apparatus according to the fifth or sixth aspect, the measuring means may be configured to prompt the measurement information by measuring a movement amount of the distal end portion of the insertion portion, and the optical path switching controller may be configured to: determine to switch the optical paths when the movement amount of the distal end portion indicated by the measurement information is less than a predetermined movement amount threshold value, and determine not to switch the optical paths cannot be switched when the movement amount of the distal end portion indicated by the measurement information is equal to or more than the movement amount threshold value.

According to an eighth aspect of the present invention, in the endoscopic apparatus according to any one of the fourth aspect to the seventh aspect, the information prompting means may be an identification means configured to prompt identification information for identifying a type of the insertion portion.

According to a ninth aspect of the present invention, in the endoscopic apparatus according to the eighth aspect, the identification means may be configured to prompt the identification information indicating the type of the image sensor, and the optical path switching controller may be configured to output the optical-path-switch driving signal in response to the type of the image sensor indicated by the identification information when the optical path switching controller determines to switch the optical paths.

According to a tenth aspect of the present invention, in the endoscopic apparatus according to the ninth aspect, the identification information may be information indicating a frame rate by which the image sensor captures the first objective image and the second objective image, the optical path switching controller may be configured to output the optical-path-switch driving signal at a first speed when the frame rate is indicated as a first frame rate, and the optical path switching controller may be configured to output the optical-path-switch driving signal at a second speed slower than the first speed when the frame rate indicated as a second frame rate is lower than the first frame rate.

According to an eleventh aspect of the present invention, in the endoscopic apparatus according to the eighth aspect to the tenth aspect, the identification means may be configured to prompt the identification information indicating a type of an objective optical system formed by a combination of the first objective optical system and the second objective optical system, and the optical path switching controller may be configured to output the optical-path-switch driving signal corresponding to the type of the objective optical system indicated by the identification information when the optical path switching controller determines to switch the optical paths.

According to a twelfth aspect of the present invention, in the endoscopic apparatus according to the eleventh aspect, the optical path switching controller may be configured to output the optical-path-switch driving signal at a first speed when the optical system is identified as a measurement optical system configured to measure the object by switching the optical paths at a second speed, and the optical path switching controller may be configured to output the optical-path-switch driving signal at a third speed slower than the first speed when the optical system is identified as an observation optical system configured to observe the object by switching the optical paths at a fourth speed slower than the second speed.

According to a thirteenth aspect of the present invention, in the endoscopic apparatus according the third aspect to the twelfth aspect, the optical path switching means may be configured to switch the optical paths by sliding a shielding member due to a magnetic field generated according to a current polarity of the optical-path-switch driving signal to shield either of the first optical path or the second optical path.

According to a fourteenth aspect of the present invention, in the endoscopic apparatus according to the thirteenth aspect, the optical path switching controller may be configured to output the optical-path-switch driving signal with a first current value when the optical paths are switched at a first speed, and the optical path switching controller may be configured to output the optical-path-switch driving signal with a second currently value lower than the first currently value when the optical paths are switched at a second speed slower than the first speed.

According to a fifteenth aspect of the present invention, in the endoscopic apparatus according to the first aspect to the fourteenth aspect, the insertion portion may be configured by a scope having a flexible cord and an optical adapter attachable to and removable from a distal end side of the scope, the first objective optical system, the second objective optical system, and the optical path switching means may be disposed inside the optical adapter, and the image sensor may be disposed at the distal end side of the scope.

According to a sixteenth aspect of the present invention, in the endoscopic apparatus according to the second aspect to the fifteenth aspect, the optical path switching controller may be configured to inform a determination result when the optical path switching controller determines that the optical paths cannot be switched.

According to a seventeenth aspect of the present invention, a control method of an endoscopic apparatus having an insertion portion configured to extend in a longitudinal direction and having a distal end portion; a first objective optical system disposed in the distal end portion and configured to form a first objective image of an object on an imaging region by transmitting light from the object through a first optical path; a second objective optical system disposed in the distal end portion and configured to form a second objective image of the object on the imaging region by transmitting the light from the object through a second optical path; an optical path switching means configured to switch an optical path of the light from the object to either of the first optical path or the second optical path such that either of the first objective image or the second objective image is formed on the imaging region; an image sensor configured to capture the first objective image and the second objective image formed on the imaging region; and an optical path switching controller configured to control the optical path switching means to switch the optical paths of the light from the object according to a state of the insertion portion, the control method of an endoscopic apparatus has: determining whether to switch the optical paths according to a state of the insertion portion; controlling the optical path switching means to switch the optical paths when it is determined to switch the optical paths; and controlling the optical path switching means not to switch the optical paths when it is determined not to switch the optical paths.

According to an eighteenth aspect of the present invention, a non-transitory computer-readable medium stores a control program for causing a computer included in an optical path switching controller of an endoscopic apparatus to execute, the endoscopic apparatus having: an insertion portion configured to extend in a longitudinal direction and having a distal end portion; a first objective optical system disposed in the distal end portion and configured to form a first objective image of an object on an imaging region by transmitting light from the object through a first optical path; a second objective optical system disposed in the distal end portion and configured to form a second objective image of the object on the imaging region by transmitting the light from the object through a second optical path; an optical path switching means configured to switch an optical path of the light from the object to either of the first optical path or the second optical path such that either of the first objective image or the second objective image is formed on the imaging region; an image sensor configured to capture the first objective image and the second objective image formed on the imaging region; and the optical path switching controller configured to control the optical path switching means to switch the optical paths of the light from the object according to a state of the insertion portion, the control program causes the computer included in the optical path switching controller to execute: a processing of determining whether to switch the optical paths according to a state of the insertion portion; a processing of controlling the optical path switching means to switch the optical paths when it is determined to switch the optical paths; and a processing of controlling the optical path switching means not to switch the optical paths when it is determined that the optical paths cannot be switched.

BRIEF DESCRIPTION OF DRAWINGS

FIG. 8 is a flowchart showing a processing sequence of optical path switching in the endoscopic apparatus according to the fourth embodiment of the present invention.

DETAILED DESCRIPTION OF THE INVENTION

First Embodiment

Figure 1:
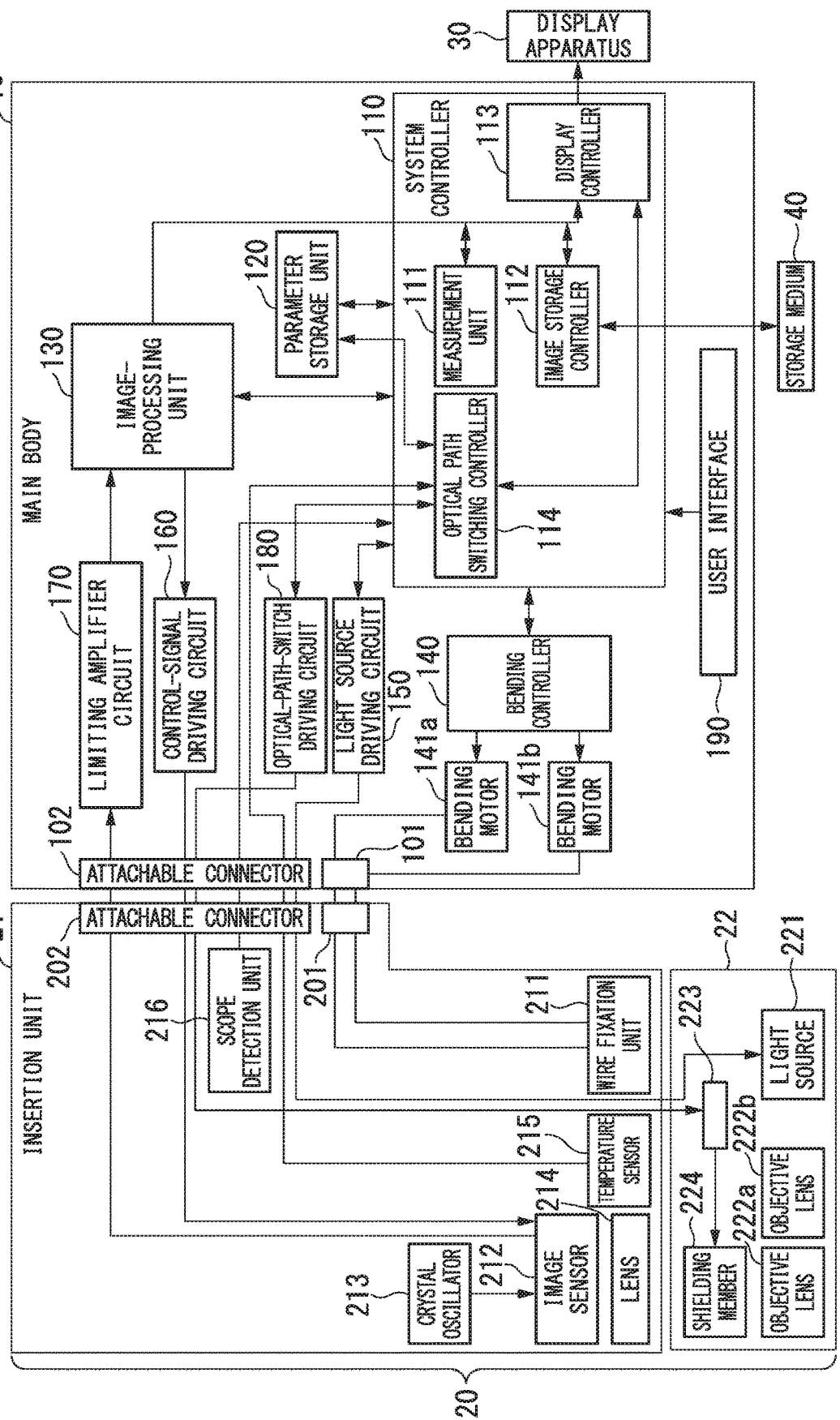
FIG. 1 is a block diagram showing a configuration of an endoscopic apparatus according to a first embodiment of the present invention.

Embodiments of the present invention will be described by referring to the enclosed figures. In the description shown as below, an endoscopic apparatus according to a first embodiment is described as an industrial endoscopic apparatus. FIG. 1 is a block diagram showing a configuration of the endoscopic apparatus according to the first embodiment of the present invention. The endoscopic apparatus 1 shown in FIG. 1 has a main body 10 and an elongated insertion portion 20. In the endoscopic apparatus 1 shown in FIG. 1, the main body 10 is connected to a display apparatus 30 and a storage medium 40.

In the endoscopic apparatus 1, a flexible distal end side of the insertion portion 20 (hereinafter described as a "distal end portion") having an extending shape along a predetermined central axis is inserted into a specimen. The endoscopic apparatus 1 is configured to transmit a pixel signal representing an objective image inside the specimen to the main body 10 connected to a proximal end side of the insertion portion 20, wherein the pixel signal is obtained by using an image sensor disposed in the distal end portion to capture an image of the object. In the endoscopic apparatus 1, when the insertion portion 20 is inserted into the specimen, the movement and the direction of the distal end portion and further the photographing of the object by the image sensor disposed at the distal end portion are controlled by the main body 10.

In the endoscopic apparatus 1, the pixel signal transmitted from the insertion portion 20 is processed in the main body 10 to generate an image (video) of the object inside the specimen. In the endoscopic apparatus 1, the generated image (video) of the object is displayed on the connected display apparatus 30. The display apparatus 30 is configured to display the image of the object inside the specimen captured by the endoscopic apparatus 1. For example, the display apparatus 30 is a Liquid Crystal Display (LCD) or the like. In FIG. 1, the display apparatus 30 is an external configuration element connected to the main body 10, that is, the display apparatus 30 is an external display apparatus attachable to and removable from the main body 10. However, the display apparatus 30 may be a configuration element installed on the main body 10.

The endoscopic apparatus 1 is configured to store the image (video) of the object generated in the main body 10 in the storage medium 40. The storage medium 40 is configured to store the image data of the object inside the specimen captured by the endoscopic apparatus 1. For example, the storage medium 40 is a storage medium attachable to and removable from the main body 10, such as a SD memory card or a Universal Serial Bus (registered mark) memory (USB memory) and the like. In FIG. 1, the storage medium 40 is shown as an external storage medium attachable to and removable from the main body 10; however, for example, the storage medium may be an internal configuration element integrated in the main body 10, for example, a storage device such as a hard disk drive and the like.

At a time when the endoscopic apparatus 1 does not photograph inside the specimen, for example, a flexible cord of the insertion portion 20 for introducing the image sensor disposed in the distal end portion into the specimen may be wound on a drum portion (not shown) attached to the main body 10 to be accommodated.

The main body 10 has a system controller 110, a parameter storage unit 120, an image-processing unit 130, a bending controller 140, two bending motors 141a, 141b, a light source driving circuit 150, a control-signal driving circuit 160, a limiting amplifier circuit 170, an optical-path-switch driving circuit 180, a user interface 190, a wire connection mechanism 101, and an attachable connector 102. The system controller 110 has a measurement unit 111, an image storage controller 112, a display controller 113, and an optical path switching controller 114.

The insertion portion 20 includes a scope 21 having the flexible cord and an optical adapter 22 attachable to and removable from the distal end side of the scope 21. The scope 21 is configured to have a wire fixation unit 211, an image sensor 212, a crystal oscillator 213, a lens 214, a temperature sensor 215, a scope detection unit 216, a wire connection mechanism 201, and an attachable connector 202. The optical adapter 202 includes a light source 221, two objective lens 222a, 222b, an optical path switching unit 223, and a shielding member 224. In the scope 21, the wire fixation unit 211, the image sensor 212, the crystal oscillator 213, the lens 214, and the temperature sensor 215 are disposed on the distal end side thereof to which the optical adapter 22 is attached. In the description below, the distal end side of the scope 21 at which the image sensor 212 and the like are disposed and the optical adapter 22 attached to the distal end side of the scope 21 are described as the distal end portion of the insertion portion 20.

Each configuration element provided in the endoscopic apparatus 1 will be described below. At first, the configuration elements of the optical adapter 22 which is attached to the distal end side of the scope 21 to form the distal end portion of the insertion portion 20 will be described in details.

The optical adapter 22 is an optical adapter configured to make the light of the objective image inside the specimen to be incident on the image sensor 212 disposed at the distal end side of the scope 21. The optical adapter 22 is a stereo measurement adapter used in a stereo photographing for performing the stereo measurement with respect to the object inside the specimen by the endoscopic apparatus 1.

The light source 221 is a light source configured to emit the light for irradiating the object inside the specimen. The light source 221 is configured to generate the light for a specified light amount and at a timing in according to a driving signal output from the main body 10 and transmitted via signal lines inside the scope 21. For example, the light source 221 is a white Light Emitting Diode (LED) light source and the like.

Each of the objective lens 222a and the objective lens 222b are optical lens configured to emit the incident light, specifically the reflection light from the object which is irradiated by the light emitted from the light source 221, to the side of the image sensor 212 to form the objective image on the image sensor 212. Each of the objective lens 222a and the objective lens 222b are optical lens configured to form the image with respect to the reflection light from the object on a same (common) imaging region. For example, each of the objective lens 222a and the objective lens 222b is configured to form the image with respect to the reflection light from the object on the whole imaging region of the image sensor 212. One of the objective lens 222a and the objective lens 222b is the optical lens equivalent to the image captured by the right eye and the other is the optical lens equivalent to the image captured by the left eye. Accordingly, a parallax is shown in the objective images on the image sensor 212 formed by the objective lens 222a and the objective lens 222b. The endoscopic apparatus 1 can form the three-dimensional image of the object to perform the stereo measurement.

The shielding member 224 is a shielding plate configured to shield (mask) the reflection light from the object and emitted by the objective lens 222a and the objective lens 222b to the scope 21 side. The shielding member 224 is moved (slid) to be to either of the optical paths on which the objective lens 222a and the objective lens 222b emit the light by the optical path switching unit 223. Accordingly, the reflection light from the object emitted by either of the objective lens 222a and the objective lens 222b is emitted to the whole imaging region of the image sensor 212.

The optical path switching unit 223 is a mechanical mechanism (for example, an actuator or the like) configured to switch the light incident on the image sensor 212 by moving (sliding) the shielding member 224. The optical path switching unit 223 is configured to move (slide) the shielding member 224 to the optical path on which the objective lens 222a emits the light so as to make the light emitted from the objective lens 222b to be incident on the image sensor 212. In other words, the optical path switching unit 233 is configured to switch the light incident on the image sensor 212 by moving (sliding) the shielding member 224 to the optical path on which the objective lens 222a emits the light or the optical path on which the objective lens 222b emits the light. The optical path switching unit 223 is configured to move (slide) the shielding member 224 at a speed and a timing corresponding to the driving signal output from the main body 10 and transmitted via the signal line inside the scope 21 so as to switch the optical path on which the light is emitted to the image sensor 212 (in other words, the optical path on which the light is shielded by the shielding member 224). Accordingly, the image sensor 212 can capture both the objective image equivalent to the image captured by the left eye and the objective image equivalent to the image captured by the right eye.

For example, the optical path switching unit 223 is configured to have a permanent magnet fixed to a rotation axis so as to rotate in the direction in which the shielding member 224 is moved (slided) and a coil disposed around the permanent magnet. In the optical path switching unit 223 having such a configuration, the shielding member 224 is fixed to the rotation axis and a polarization current is applied to the coil as a driving signal corresponding to the rotation direction of the rotation axis. Accordingly, the coil generates a magnetic field (force field) according to the polarity of the applied current such that the rotation axis is rotated by the generated force field in the direction according to the polarity of the current applied to the coil to move (slide) the shielding member 224 fixed to the rotation axis. The configuration of the optical path switching unit 223 is not limited thereto, and the optical path switching unit 223 only has to be configured to move (slide) the shielding member 224 to either of the optical path on which the objective lens 222a emits the light or the optical path on which the objective lens 222b emits the light.

Subsequently, the configuration elements included in the scope 21 to form the insertion portion 20 will be described in details.

In a state in which the optical adapter 22 is attached to the distal end side of the scope 21, the scope 21 is inserted into the specimen from the distal end portion, and the scope 21 is configured to transmit the pixel signal representing the objective image to the main body 10, wherein the objective image is formed by imaging the reflection light which is reflected from the object inside the specimen and incident from the optical adapter 22.

The wire fixation unit 211 is a mechanism for fixing one end of a bending wire to the distal end side of the insertion portion 20, wherein the bending wire is configured to change the movement and the direction of the distal end side of the scope 21, in other words, the distal end portion of the insertion portion 20 by the main body 10.

The lens 214 is a relay lens configured to emit the reflection light which is reflected from the object inside the specimen and incident from the optical adapter 22 to the image sensor 212 side. The lens 214 is formed by the lens of parallel flat plates and the like. The lens 214 is configured to make the light to be incident on the whole imaging region of the image sensor 212, wherein the light incident on the image sensor 212 is emitted on the optical path of the objective lens 222a or the optical path of the objective lens 222b toward the image sensor 212 respectively, and the optical path of the objective lens 222a and the optical path of the objective lens 222b toward the image sensor 212 are switched by the optical path switching unit 223 provided at the optical adapter 22.

The crystal oscillator 213 is configured to generate a clock signal necessary for the operation of the image sensor 212 and transmit the generated clock signal to the image sensor 212.

The image sensor 212 is a Complementary Metal-Oxide Semiconductor (CMOS) image sensor operating according to the clock signal applied by the crystal oscillator 213. The image sensor 212 captures the objective image inside the specimen in response to the control signal output from the main body 10. The image sensor 212 transmits the pixel signal (for example, a RAW signal) representing the objective image inside the specimen to the main body via the signal line inside the cord. For example, the image sensor 212 transmits the pixel signal of the captured objective image to the main body 10 transmission methods such as the Scalable Low Voltage Signaling with Embedded Clock (SLVS-EC) serial communication and the like.

The temperature sensor 215 is a temperature measurement means (sensor) configured to measure the temperature of the optical path switching unit 223 which generates heat while moving (sliding) the shielding member 224. The temperature sensor 215 is configured to measure the temperature change of the optical path switching unit 223 by measuring the temperature of the distal end side of the scope, that is, the distal end portion of the insertion portion 20. The temperature sensor 215 is configured to always (in real-time) output (prompt) the temperature information representing the measured temperature of the distal end portion to the main body 10 via the signal line inside the cord. For example, the temperature sensor 215 is configured by a thermistor element and the like. In this case, the temperature sensor 215 outputs a voltage signal (analog signal) representing a resistance value of the thermistor element which is changed in accordance with the temperature of the distal end portion to the main body 10 as the temperature information. The temperature sensor 215 is not limited to the configuration of using the thermistor element to output the analog signal, and the temperature sensor 215 may be configured as a temperature sensor IC and the like which outputs the data representing the measured temperature of the distal end portion as the temperature information. The temperature sensor disposed at the distal end portion of the insertion portion 20 for measuring the temperature of the image sensor 212 may be used as the temperature sensor 215.

The wire connection mechanism 201 is a mechanism configured to make the insertion portion 20 (more specifically, the scope 21) to be attachable to and removable from the main body 10, and the wire connection mechanism 201 is configured to connect the bending wire with a wire configured to change the movement and the direction of the distal end portion of the insertion portion 20 with respect to the main body 10, wherein the bending wire is fixed at the distal end side of the scope 21 by the wire fixation unit 211. In order to make the description simple, the bending wire and the wire at the side of the main body 10 which are connected by the wire connection mechanism 201 are described as a single wire, and whole of the connected wires are called the bending wire.

The attachable connector 202 is configured to make the insertion portion 20 (more specifically, the scope 21) to be attachable to and removable from the main body 10, and the attachable connector 202 is the mechanism configured to connect the signal lines between the corresponding configuration elements of the scope 21, the optical adapter 22 and the main body 10. In order to make the description simple, the signal lines between the corresponding configuration elements of the scope 21, the optical adapter 22 and the main body 10 are described as a signal line.

The scope detection unit 216 is configured to output a detection signal to the main body 10, wherein the detecting signal indicates that the insertion portion 20 (more specifically, the scope 21) is attached to the main body 10. The scope detection unit 216 is configured to output the detection signal to the main body 10 representing that an end of the cord opposite to the distal end side of the scope 21 is properly connected to the main body 10.

Subsequently, the configuration elements included in the main body 10 will be described in details.

The main body 10 is configured to control the imaging and the measurement of the object inside the specimen by the endoscopic apparatus 1 in response to an operation by a user of the endoscopic apparatus 1.

The wire connection mechanism 101 is configured to make the insertion portion 20 (more specifically, the scope 21) to be attachable to and removable from the main body 10, and the wire connection mechanism 101 is a mechanism at the side of the main body 10 to connect the bending wire fixed by the wire fixation unit 211 with the distal end side of the scope 21 as a single wire.

The attachable connector 102 is configured to make the insertion portion 20 (more specifically, the scope 21) to be attachable to and removable from the main body 10 by being coupled with the attachable connector 202 disposed at the scope 21, and the attachable connector 102 is a mechanism at the side of the main body which is configured to connect the signal lines between the corresponding configuration elements of the scope 21, the optical adapter 22 and the main body 10 as a single signal line.

The limiting amplifier circuit 170 is an amplifier circuit (amp) configured to amplify the pixel signal of the objective image which is transmitted via the corresponding signal lines from the image sensor 212 disposed at the distal end portion of the insertion portion 20. In the endoscopic apparatus 1, since the insertion portion 20 (more specifically the scope 21) is extremely long (for example, a length of ten meters) such that the pixel signal output by the image sensor 212 is attenuated during the transmission via the corresponding signal lines to the main body 10, the limiting amplifier circuit 170 is provided at the main body 10. The limiting amplifier circuit 170 is configured to amplify the pixel signal output by the image sensor 212 to a necessary signal level for the image processing performed by the image-processing unit 130. The limiting amplifier circuit 170 outputs the pixel signal with an amplified signal level to the image-processing unit 130.

The image-processing unit 130 is a digital signal processing unit configured to perform various predetermined image processing with respect to the pixel signal (for example, the RAW signal) of the objective image output by the image sensor 212 in the distal end portion and amplified by the limiting amplifier circuit 170 so as to generate the image (video) of the object inside the specimen. Here, the image processing performed by the image-processing unit 130 refers to a transformation of the pixel signal of the objective image output by the image sensor 212 to an image signal having a general image format such as YUV422, in other words, the developing process. For example, in a situation in which a color array of a color filter which is affixed to the pixels disposed in the imaging region of the image sensor 212 is arranged as the Bayer array, during the developing process, the image-processing unit 130 is configured to perform the three-plate process to transform the image signal to the luminance signal and the color signal representing the image (video) of the object according to the pixel information included in the pixel signal output by the image sensor 212. Furthermore, the image-processing unit 130 may be configured to perform signal processing such as the gamma correction processing and the contour correction processing with respect to the processed pixel signal after the three-plate process. The image-processing unit outputs the image (video) of the object, which is generated by the developing process with respect to the pixel signal output by the image sensor 212, to the system controller 110.

The image-processing unit 130 is configured to output the control signal for controlling the image sensor 212 to the image sensor 212 according to the various settings related to the start-up operation and the capturing operation of the image sensor 212 defined by the system controller 110. The image-processing unit 130 is configured to output the control signal to the image sensor 212 according to various predetermined serial communication methods such as the Inter-Integrated Circuit (I2C) method and the Serial Peripheral Interface (SPI) method. As described above, in the endoscopic apparatus 1, it is considered that the insertion portion 20 (more specifically the scope 21) is extremely long (for example, a length of ten meters) such that the control signal output by the image-processing unit 130 is attenuated during the transmission via the corresponding signal lines to the image sensor 212 disposed at the distal end side of the cope 21. Accordingly, the image-processing unit 130 is configured to output the control signal for the image sensor 212 to a control-signal driving circuit 160.

The control-signal driving circuit 160 is a driving circuit configured to amplify the control signal output by the image-processing unit 130 for the image sensor 212 and output the amplified control signal. The control-signal driving circuit 160 is configured to amplify the control signal output by the image-processing unit 130 to a necessary signal level so as to make the control signal to be correctly input to the image sensor 212 disposed at the distal end side of the scope 21. More specifically, the control-signal driving circuit 160 is configured to perform the current amplification with respect to the control signal output by the image-processing unit 130 and output the amplified control signal to the image sensor 212. Thus, the image sensor 212 correctly receives the control signal output by the image-processing unit 130 so as to perform the capturing operation in response to the operation mode and the setting information according to the received control signal.

The user interface 190 is an interface configured to receive operations by a user of the endoscopic apparatus 1. The user interface 190 is configured to output the information representing the received operations of the user of the endoscopic apparatus 1 to the system controller 110. For example, the user interface 190 is formed as an exclusive operating apparatus such as a remote terminal having a button, a switch, or a joystick. The user of the endoscopic apparatus 1 instructs the movement and the direction of the distal end portion when the distal end portion of the insertion portion 20 is inserted into the specimen by operating the user interface 190. The user of the endoscopic apparatus 1 instructs the imaging and the measurement of the object by the endoscopic apparatus 1.

The parameter storage unit 120 is a memory configured to store program data and setting data for realizing the functions of the system controller 110. For example, the parameter storage unit 120 is formed by including various memories such as a Read Only Memory (ROM), an Erasable Programmable Read Only Memory (EPROM), a Random Access Memory (RAM), and a Flash Memory.

The system controller 110 is a controller configured to perform the overall control of the endoscopic apparatus 1. The system controller 110 is configured by including a processing device such as a Central Processing Unit (CPU) and the like. At the start-up, the system controller 110 is configured to read the program data and the setting data stored in the parameter storage unit 120 and operate according to the read program data and the setting data (initial value).

The system controller 110 is configured to control the movement and the direction of the distal end portion of the insertion portion 20 in response to the instructions regarding the movement and the direction of the distal end portion input by the operations of the user of the endoscopic apparatus 1 with respect to the user interface 190. At this time, the system controller 110 outputs the control signal (hereinafter described as a "bending control signal") for controlling the movement and direction of the distal end portion of the insertion portion 20 (more specifically, the distal end side of the scope 21) to the bending controller 140.

The bending controller 140 is configured to generate a control signal for actually controlling the movement and the direction of the distal end portion of the insertion portion 20 according to the bending control signal output by the system controller 110. More specifically, the bending controller 140 is configured to generate a control signal for moving the distal end portion of the insertion portion 20 in the up/down directions and a control signal for moving the distal end portion of the insertion portion 20 in the left/right directions. Then, the bending controller 140 outputs the generated control signals to the bending motor 141a and the bending motor 141b respectively. For example, the bending controller 140 outputs the control signal (hereinafter described as a "up-down driving signal") for moving the distal end portion of the insertion portion 20 in the up/down directions to the bending motor 141a and outputs the control signal (hereinafter described as a "left-right driving signal") for moving the distal end portion of the insertion portion 20 in the left/right directions to the bending motor 141b. When the bending controller 140 drives each of the bending motors 141a, 141b with the corresponding control signal, a feed-back control is performed according to the actual movement amount of the bending motors 141a, 141b respectively. In other words, the bending controller 140 is configured to perform the feed-back control with respect to the distal end portion of the insertion portion 20 by detecting the actual movement amount of the bending wire.

Each of the bending motors 141a, 141b is a motor configured to actually move the distal end portion of the insertion portion 20 by pulling the corresponding bending wire according to the corresponding drive signal output by the bending controller 140. More specifically, each of the bending motors 141a, 141b is configured to pull one of the two bending wires in the corresponding directions while relaxing (does not positively push) the other bending wire so as to direct the distal end portion of the insertion portion 20 to the direction instructed by the user's operation with respect to the user interface 190. For example, in a situation in which the bending motor 141a is the motor configured to move the distal end portion of the insertion portion 20 in the up/down directions, the bending motor 141a is configured to pull the bending wires corresponding to the up/down directions in the manner described above according to the up-down driving signal output by the bending controller 140 so as to actually move the distal end portion of the insertion portion 20 in the up/down directions. For example, in a situation in which the bending motor 141b is the motor configured to move the distal end portion of the insertion portion 20 in the left/right directions, the bending motor 141b is configured to pull the bending wires corresponding to the left/right directions in the manner described above according to the left-right driving signal output by the bending controller 140 so as to actually move the distal end portion of the insertion portion 20 in the left/right directions. For example, a potentiometer (not shown) is provided in each of the bending motors 141a, 141b. The potentiometer (not shown) is configured to detect the actual rotation amount of each of the bending motors 141a, 141b in order to pull the bending wires in response to the corresponding driving signal. The information of the rotation amount of each of the bending motors 141a, 141b which is detected by the potentiometer is output to the bending controller 140 so as to be used in the feed-back control.

The system controller 110 is configured to control the imaging of the object inside the specimen in response to the imaging instructions input to the user interface 190 by the operations of the user of the endoscopic apparatus 1. At this time, the system controller 110 is configured to transmit various settings regarding the start-up and imaging operations of the image sensor 212 disposed at the distal end portion (more specifically, the distal end side of the scope 21) to the image-processing unit 130 by a predetermined communication method such as the Universal Asynchronous Receiver-Transmitter (UART), for example. The system controller 110 is configured to output a driving signal (hereinafter described as a "light-emission driving signal") for controlling the light amount and the timing of the light emitted by the light source 221 disposed at the distal end portion of the insertion portion 20 (more specifically, the optical adapter 22 attached to the distal end side of the scope 21) to the light source 221. At this time, the system controller 110 acquires the information of the control signal output by the image-processing unit 130 to the image sensor 212, that is, the information regarding the operation timing of the image sensor 212 from the image-processing unit 130 using the UART. Then, the system controller 110 outputs the light-emission driving signal to the light source 221 at the timing coincide with the operation timing of the image sensor 21 according to the information of the acquired control signal. That is, the system controller 110 outputs the light-emission driving signal to the light source 221 so as to control the light source 221 to emit light at the timing synchronized with the imaging timing of the objective image at the image sensor 212 according to the information of the acquired control signal. More specifically, the system controller 110 outputs the light-emission driving signal to the light source 221 so as to control the light source 221 to emit light during an exposure period when the image sensor 212 captures the objective image. As described above, in the endoscopic apparatus 1, since the insertion portion 20 (more specifically, the scope 21) is extremely long, even if the system controller 110 directly outputs the light-emission driving signal for driving the light source 221 to the light source 221, it is considered that the light-emission driving signal is attenuated during the transmission toward the light source 221 disposed at the optical adapter 22. Accordingly, the system controller 110 outputs the light-emission driving signal for the light source 221 to the light source driving circuit 150.

The light source driving circuit 150 is a driving circuit configured to amplify and output the light-emission driving signal output from the system controller 110 to the light source 221. The light source driving circuit 150 is configured to amplify the light-emission driving signal output from the system controller 110 to the necessary signal level so as to make the light-emission driving signal to be correctly input to the light source 221 inside the optical adapter 22 attached to the distal end side of the scope 21. Similar with the control-signal driving circuit 160, the light source driving circuit 150 is configured to perform the current amplification with respect to the light-emission driving signal output by the system controller 110 and output the amplified light-emission driving signal to the light source 221. Accordingly, the light source 221 emits the light in an amount according to the light-emission driving signal at the timing synchronized with the image sensor 212.

The configuration for controlling the light source 221 inside the optical adapter 22 attached to the distal end side of the scope 21 is not limited to the configuration described above. For example, a configuration may be adopted such that the system controller 110 outputs a control signal for controlling the light-emission of the light source 221 (hereinafter described as a "light-emission control signal") to the light source driving circuit 150 and the light source driving circuit 150 generates and outputs the light-emission driving signal for controlling the light source to emit the light in the light amount and at the timing indicated by the light-emission control signal output from the system controller 110.

The system controller 110 is configured to control the display of the image (video) of the object generated by the image-processing unit 130 on the display apparatus 30 and the storage of the image (video) of the object to the storage medium 40 according to the display instructions and the storage instructions input by the operations of the user of the endoscopic apparatus 1 with respect to the user interface 190. More specifically, the display controller 113 included in the system controller 110 is configured to control the display apparatus 30 to display the image (video) of the object generated by the image-processing unit 130. The image storage controller 112 included in the system controller 110 is configured to control the storage medium 40 to store the image (video) of the object generated by the image-processing unit 130.

The display controller 113 controls the display apparatus 30 to display the image (video) of the object generated by the image-processing unit 130. More specifically, the display controller 113 transforms the image (video) of the object generated by the image-processing unit 130 to a display image with a format and an image size suitable for displaying on the display apparatus 30, and outputs the display image to the display apparatus 30 for displaying. For example, the display controller 113 also performs the control of superimposing an On Screen Display (OSD) for representing various information such as the operation menus of the endoscopic apparatus 1 and the measurement results of the object on the display image and controls the display apparatus 30 to display the display image superimposed by the OSD.

The image storage controller 112 is configured to control the storage medium 40 to store the image (video) of the object generated by the image-processing unit 130. More specifically, the image storage controller 112 transforms the image (video) of the object generated by the image-processing unit 130 to a storage image with a format and an image size suitable for being stored in the storage medium 40 and outputs the storage image to the storage medium 40 for storing. A compressed still image format such as JPEG and a compressed motion image format such as MPEG are used as the format of the storage image which is transformed by the image storage controller 112.

In the endoscopic apparatus 1, the stereo measurement of the object inside the specimen is performed by the configuration of the insertion portion 20, that is, the configuration of the optical adapter 22 attached to the distal end portion of the scope 21 described above. Accordingly, the system controller 110 is configured to control the stereo imaging of the object in response to the measurement instruction input by the operations of the user of the endoscopic apparatus 1 with respect to the user interface 190. In the stereo measurement in the endoscopic apparatus 1, optical paths of the reflection light from the object and incident on the image sensor 212 is switched in time series. More specifically, as described above, in the endoscopic apparatus 1, the optical paths of the light emits to the image sensor 212 are switched in time series by the optical path switching unit 223 disposed at the distal end portion of the insertion portion 20 (more specifically, the optical adapter 22 attached to the distal end side of the scope 21) so as to cause the reflection light from the object which is emitted by either of the objective lens 222a or the objective lens 222b to be incident on whole of the imaging region of the image sensor 212. In the endoscopic apparatus 1, the optical path switching controller 114 disposed at the system controller 110 is configured to control the switching of the optical paths of the light incident on the image sensor 212 in time series.

The optical path switching controller 114 is configured to output a driving signal (hereinafter described as a "optical-path-switch driving signal") to the optical path switching unit 223, wherein the driving signal is used for controlling the switching of the optical paths of the light emitted from the optical path switching unit 223 disposed at the distal end portion of the insertion portion 20 (more specifically the optical adapter 22 attached to the distal end side of the scope 21) to the image sensor 212 in time series. That is, the driving signal is used for controlling a speed by which the shielding member 224 is moved (slided) by the optical path switching unit 223 and the timing when the shielding member 224 is moved (slided) by the optical path switching unit 223. At this time, the optical path switching controller 114 outputs the optical-path-switch driving signal for switching the optical paths of the light incident on the image sensor 212 to the optical path switching unit 223 at the timing synchronized with the imaging timing of the objective image at the image sensor according to the information of the control signal acquired from the image-processing unit 130. More specifically, the optical path switching controller 114 outputs the optical-path-switch driving signal to the optical path switching unit 223 so as to switch the optical paths of the light incident on the image sensor 212 during the period when the image sensor 212 captures the objective image and outputs the pixel signal, in other words, the period between the time when one exposure period has finished and the time when next exposure period begins. In the description below, the period between the time when one exposure period has finished and the time when next exposure period begins is described as a "pixel-signal-read period". As described above, in the endoscopic apparatus 1, since the insertion portion 20 (more specifically, the scope 21) is extremely long, even if the system controller 110 directly outputs the optical-path-switch driving signal to the optical path switching unit 223, wherein the optical-path-switch driving signal is used for switching the optical paths of the reflection light from the object and incident on the image sensor 212, the output optical-path-switch driving signal is attenuated during the transmission to the optical path switching unit 223 provided at the optical adapter 22 via the corresponding signal lines. Accordingly, the system controller 110 (more specifically, the optical path switching controller 114) is configured to output the optical-path-switch driving signal for the optical path switching unit 223 to the optical-path-switch driving circuit 180.

The optical path switching controller 114 is configured to inform the display controller 113 with that the optical-path-switch driving signal is output to the optical path switching unit 223. Accordingly, the display controller 113 can control the display apparatus 30 to display the images (videos) of a pair, that is, two frames of images (videos) of the object inside the specimen generated by the image-processing unit 130 as the image (video) equivalent to the image captured by the right eye and the image (video) equivalent to the image captured by the left eye.

The optical path switching controller 114 is configured to control the output of the optical-path-switch driving signal to the optical path switching unit 223 based on the temperature informing representing the temperature of the distal end portion which is measured by the temperature sensor 215 equipped at the distal end portion of the insertion portion 20 (more specifically, the distal end side of the scope 21). In other words, the optical path switching controller 114 is configured to determine whether to switch the optical paths for emitting the light to the image sensor 212 for the stereo measurement according to the temperature of the distal end portion of the insertion portion 20 and the optical path switching controller 114 controls the output of the optical-path-switch driving signal to the optical path switching unit 223 according to the determination result. At this time, the optical path switching controller 114 determines whether to switch the optical paths for emitting the light to the image sensor 212 according to a predetermined threshold value of the temperature of the distal end portion which is stored in the parameter storage unit 120. The control method of determining whether to perform the stereo photographing by the optical path switching controller 114 will be described below.

The optical-path-switch driving circuit 180 is a driving circuit configured to amplify and output the optical-path-switch driving signal output from the optical path switching controller 114 in the system controller 110 to the optical path switching unit 223. The optical-path-switch driving circuit 180 is configured to amplify the optical-path-switch driving signal output from the optical path switching controller 114 to a necessary signal level such that the optical-path-switch driving signal is corrected input to the optical path switching unit 223 inside the optical adapter attached to the distal end side of the scope 21. In the same way as the control-signal driving circuit 160 and the light source driving circuit 150, the optical-path-switch driving circuit 180 is configured to perform the current amplification with respect to the optical-path-switch driving signal output by the optical path switching controller 114 and output the amplified optical-path-switch driving signal to the optical path switching unit 223. Accordingly, at the timing synchronized with that of the image sensor 212, the optical path switching unit 223 can change the reflection light from the object and incident on whole of the imaging region of the image sensor 212 by switching between the reflection light emitted via either optical path of the objective lens 222a or the objective lens 222b indicated by the optical-path-switch driving signal.

The configuration of switching the optical paths of the reflection light from the object and incident on the image sensor 212 by the optical path switching unit 223 in the optical adapter 22 attached to the distal end side of the scope 21 is not limited to the configuration described above. For example, a configuration may be adopted that the optical path switching controller 114 outputs a control signal for switching the optical paths of the reflection light from the object and incident on the image sensor 212 (hereinafter described as an "optical-path-switch control signal") to the optical-path-switch driving circuit 180, and the optical-path-switch driving circuit 180 generates and outputs an optical-path-switch driving signal for driving the optical switching unit 223 to switch the optical paths at a speed and a timing indicated by the optical-path-switch control signal output by the optical path switching controller 114.

The endoscopic apparatus 1 performs the measurements items using the captured images of the object inside the specimen which are input by the operations of the user of the endoscopic apparatus 1 with respect to the user interface 190. In the system controller 110, the measurement unit 111 is configured to perform the measurements according to the images (videos) of the object generated by the image-processing unit 130.

The measurement unit 111 is a processing unit configured to perform measurement according to the images (videos) of the object generated by the image-processing unit 130. For example, in the situation when the stereo photographing of the object is performed at the endoscopic apparatus 1, the image-processing unit 130 generates and outputs a pair of images (videos) of the object inside the specimen captured in time series, that is, two frames of the images (videos) including the image (video) equivalent to the image captured by the right eye and the image (video) equivalent to the image captured by the left eye to the system controller 110. Accordingly, the measurement unit 111 generates a three-dimensional image according to the pair of the images (videos) of the object generated by the image-processing unit 130 and performs the stereo measurement according to the generated three-dimensional image. A method of generating the three-dimensional image for the stereo measurement and the stereo measurement method according to the generated three-dimensional image by the measurement unit 111 are the same as the methods in the existing stereo measurement such that a detailed description is omitted. Therefore, the measurement unit 111 outputs information of the measurement result using the captured objective images to the display controller 113. Accordingly, the display controller 113 superimposes the OSD image for representing the information of the measurement result by the measurement unit 111 on the display image and controls the display apparatus 30 to display the display image superimposed by the OSD image. Also, the measurement unit 111 outputs the information of the measurement result using the captured images of the object to the image storage controller 112. Accordingly, the image storage controller 112 links the information of the measurement result by the measurement unit 111 with the storage image and controls the storage medium 40 to store them.

Figure 2:
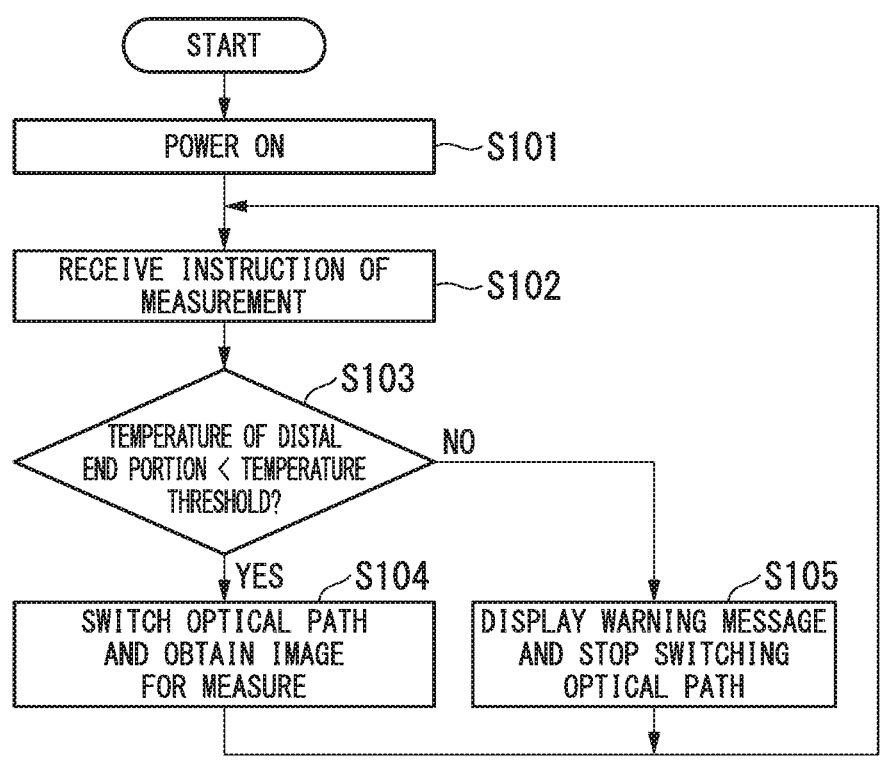
FIG. 2 is a flowchart showing a processing sequence of optical path switching in the endoscopic apparatus according to the first embodiment of the present invention.

Next, the control method of the optical path switching during the stereo photographing in the endoscopic apparatus 1 according to the first embodiment will be described. FIG. 2 is a flowchart showing an example of a processing sequence for optical path switching in the endoscopic apparatus 1 according to the first embodiment of the present invention. In FIG. 2, a method of determining whether to perform the stereo photographing and a method of controlling the optical path switching unit 223 provided at the optical adapter 22 attached to the distal end portion of the scope 21 according to the determination result performed by the optical path switching controller 114 provided at the system controller 110 in the main body 10 are shown.

The main body 10 is activated when the optical adapter 22 is attached to the distal end portion of the scope 21 and the power is on (Step S101). Accordingly, the system controller 110 provided at the main body 10 reads the data of the program and setting values stored in the parameter storage unit 120 and starts the operations corresponding to the read data of the program and setting values (initial values). Subsequently, the system controller 110 performs the setting regarding the activation and the imaging operations of the image sensor 212 with respect to the image-processing unit 130. The image-processing unit 130 outputs the control signal according to the setting by the system controller 110 to the image sensor 212 via the control-signal driving circuit 160 and the corresponding signal lines. At this time, the optical path switching unit 223 is in a state in which the optical-path-switch driving signal from the optical path switching controller 114 is not output thereto. However, the optical path switching unit 223 is maintained in a state in which the shielding member 224 is moved in either of the optical path of emitting the light from the objective lens 222a or the optical path of emitting the light from the objective lens 222b which is switched to at the last time when the power of the endoscopic apparatus 1 was switched off. Accordingly, according to the setting by the image-processing unit 130, the image sensor 212 transmits the pixel signals representing the objective images generated by imaging the reflection light emitted from the object through the optical path which is not shielded by the optical path switching unit 223 to the main body via the corresponding signal lines. In other words, the image sensor 212 transmits the pixel signal representing the objective image equivalent to the image captured by either of the right eye or the left eye to the main body 10. Accordingly, the image-processing unit 130 generates the objective images (videos) corresponding to the pixel signals amplified by the limiting amplifier 170 and the system controller 110 (more specifically the display controller 113) controls the display apparatus 30 to display the generated objective images (videos) by the image-processing unit 130.

Subsequently, the user of the endoscopic apparatus 1 inserts the distal endportion of the insertion portion 20 into the specimen while confirming the current objective image (video) displayed on the display apparatus 30. The user of the endoscopic apparatus 1 operates the user interface 190 to instruct the stereo measurement of the object when the distal end portion of the insertion portion 20 reaches the position of the object as the measurement target, in other words, when the object as the measurement target is displayed on the display apparatus 30. Accordingly, the user interface 190 receives the instructions of the stereo measurement by the operations of the user of the endoscopic apparatus 1 and outputs the information representing the received instructions from the user to the system controller 110 (Step S102). The system controller 110 activates the optical path switching controller 114 in response to the instructions of the stereo measurement by the user of the endoscopic apparatus 1 input from the user interface 190 such that functions of the optical path switching controller 114 are started.

When the functions of the optical path switching controller 114 are started, firstly, the optical path switching controller 114 acquires the temperature information representing the temperature of the distal end portion measured by the temperature sensor 215. Also, the optical path switching controller 114 acquires the temperature threshold value stored in the parameter storage unit 120. The temperature threshold value is a temperature value such as 100 degrees Celsius and used for determining whether the temperature of the distal end portion is suitable for performing the stereo measurement. The optical path switching controller 114 determines whether the temperature of the distal end portion is lower than the temperature threshold value according to the acquired temperature information and the temperature threshold value (Step S103).

When the determination result of the Step S103 is that the temperature of the distal endportion is lower than the temperature threshold value ("YES" in the Step S103), the optical path switching controller 114 determines that the stereo measurement in response to the instructions from the user of the endoscopic apparatus 1 can be performed in this state. In this case, the optical path switching controller 114 determines to switch the optical paths through which the light incident on the image sensor 212 in time series, and the optical path switching controller 114 outputs the optical-path-switch driving signal to the optical path switching unit 223 via the optical-path-switch driving circuit 180 and the corresponding signal lines for each frame of the objective image captured by the image sensor 212. For example, when a frame rate of the image sensor for capturing the objective image is 60 frames per second (fps), the optical path switching controller 114 outputs the optical-path-switch driving signal for switching the optical paths to the optical path switching unit 223 by every 16.667 milliseconds. Accordingly, the system controller 110 acquires the pair of the images (videos) of the object for the measurement by capturing the reflection light from the object through the optical path which is switched by the optical path switching unit 223 (Step S104). More specifically, the image sensor 212 transmits the pixel signal representing the objective image generated by capturing the reflection light emitted through the optical path switched in each frame by the optical path switching unit 223 to the main body via the corresponding signal lines. In other words, the image sensor 212 transmits the pixel signals representing the objective image equivalent to the image captured by the left eye and the objective image equivalent to the image captured by the right eye captured in each frame to the main body 10. The image-processing unit 130 generates the images (videos) of the object corresponding to the pixel signals of each frame which are amplified by the limiting amplifier circuit 170, that is, the pair of images (videos) including the image (video) equivalent to the image captured by the left eye and the image (video) equivalent to the image captured by the right eye, and output the generated images (videos) of the object to the system controller 110.

Accordingly, the system controller 110 (more specifically the measurement unit 111) performs the stereo measurement according to the pair of images (videos) generated by the image-processing unit 130 and outputs the result of the stereo measurement to the display controller 113. Subsequently, the system controller 110 (more specifically the display controller 113) superimposes the information of the stereo measurement result by the measurement unit 111 on the pair of the images (videos) of the object generated by the image-processing unit 130 and controls the display apparatus 30 to display them.

The optical path switching controller 114 outputs the optical-path-switch driving signal for switching the optical paths through which the light incident on the image sensor 212 for at least one time such that the image-processing unit 130 can generate the pair of the images (videos). However, the optical path switching controller 114 may increase the times of outputting the optical-path-switch driving signals. In other words, the optical path switching controller 114 may control the image sensor 212 to output the pixel signals representing each of the objective image equivalent to the image captured by the right eye and the objective image equivalent to the image captured by the left eye by multiple frames. In this case, the image-processing unit 130 can generate multiple pairs of the images (videos) for the stereo measurement so as to improve the precision of the stereo measurement by the measurement unit 111.

On the other hand, when the determination result of the Step S103 is that the temperature of the distal end portion is equal to or higher than the temperature threshold value ("NO" in the Step S103), the optical path switching controller 114 determines that the stereo measurement in response to the instructions from the user of the endoscopic apparatus 1 cannot be performed in this state. In this case, the optical path switching controller 114 determines that the optical paths through which the light incident on the image sensor 212 cannot be switched in time series, and the optical path switching controller 114 informs the display controller 113 with the state in which the stereo measurement cannot be performed. Accordingly, the display controller 113 controls the display apparatus 30 to display a warning message indicating that the stereo measurement cannot be performed due to the high temperature of the distal end portion. Also, the optical path switching controller 114 does not output the optical-path-switch driving signal for switching the optical paths through which the light incident on the image sensor 212 to the optical path switching unit 223. In other words, the optical path switching controller 114 stops switching the optical paths for the stereo measurement in response to the instructions from the user of the endoscopic apparatus 1 (Step S105). Specifically, the optical path switching controller 114 does not change the polarity of the current output as the optical-path-switch driving signal. More specifically, the optical path switching controller 114 makes the polarity of the current output as the optical-path-switch driving signal to be "0". Accordingly, the optical path switching unit 223 maintains the current state in which the shielding member 224 is moved to be on either of the optical path of the light emitted by the objective lens 222a or the optical path of the light emitted by the objective lens 222b. The consumption power of moving (sliding) the shielding member 224 by the optical path switching unit 223 is reduced.

Thereafter, the system controller 110 returns to Step S102 to repeat the processing from the Step S103 to Step S105 every time when the instruction of the stereo measurement input by the operations of the user of the endoscopic apparatus 1 is received. That is, the system controller 110 determines the temperature of the distal end portion ever time when the instruction of the stereo measurement input by the operations of the user of the endoscopic apparatus 1 is received, and the system controller 110 controls the endoscopic apparatus 1 to perform the stereo measurement in response to the instruction from the user of the endoscopic apparatus 1 only when the temperature of the distal end portion is determined to be lower than the temperature threshold value.

According to the first embodiment, the endoscopic apparatus (endoscopic apparatus 1) is configured to have an insertion portion (insertion portion 20) formed to extend in a longitudinal direction along a predetermined central axis and have a distal end portion; an optical path switching means (optical path switching unit 223 and shielding member 224) disposed inside the insertion portion 20 and configured to switch optical paths such that either of a first objective image (for example the objective image equivalent to the image captured by the right eye) of an object or a second objective image (for example the objective image equivalent to the image captured by the left eye) of the object is imaged on a common imaging region (capturing region), the first objective image being formed by the light (reflection light from the object) emitted from a first objective optical system (one of the objective lens 222a and the objective lens 222b) disposed in the distal endportion, the second objective image being formed by the light (reflection light from the object) emitted from a second objective optical system (the other of the objective lens 222a and the objective lens 222b) disposed in the distal end portion, and both of the first objective image and the second objective image being able to be imaged on the imaging region; an image sensor (image sensor 212) configured to capture the first objective image and the second objective image which are imaged on the imaging region; and an optical path switching controller (optical path switching controller 114) configured to control switching of the optical paths according to a state of the insertion portion 20.

In the endoscopic apparatus 1 according to the first embodiment, the optical path switching controller 114 determines whether to switch the optical paths according to the state of the insertion portion 20, wherein the optical path switching controller 114 controls the optical path switching unit 223 to switch the optical paths when the optical path switching controller 114 determines that it is possible to switch the optical paths, and the optical path switching controller 114 controls the optical path switching unit 223 not to switch the optical paths when the optical path switching controller 114 determines that it is impossible to switch the optical paths.

In the endoscopic apparatus 1 according to the first embodiment, the optical path switching controller 114 outputs the optical-path-switch driving signal for switching the optical paths to the optical path switching unit 223 when the optical path switching controller 114 determines that it is possible to switch the optical paths, and the optical path switching controller 114 does not output the optical-path-switch driving signal when the optical path switching controller 114 determines that it is impossible to switch the optical paths.

In the endoscopic apparatus 1 according to the first embodiment, the insertion portion 20 further has an information prompting means configured to prompt (display) information indicating the state of the insertion portion 20, and the optical path switching controller 114 determines whether to switch the optical paths according to information prompted by the information prompting means to indicate the state of the insertion portion 20.

In the endoscopic apparatus 1 according to the first embodiment, the information prompting means is a measurement means configured to prompt (display) measurement information acquired by measuring the state of the insertion portion 20 (state of the distal end portion of the insertion portion 20).

In the endoscopic apparatus 1 according to the first embodiment, the measurement means (temperature sensor 215) prompts the measurement information (temperature information) by measuring the temperature of the distal end portion of the insertion portion 20, the optical path switching controller 114 determines that it is possible to switch the optical paths when the temperature of the distal end portion indicated by the temperature information is lower than the predetermined temperature threshold, and the optical path switching controller 114 determines that it is impossible to switch the optical paths when the temperature of the distal end portion indicated by the temperature information is equal to or higher than the predetermined temperature threshold.

In the endoscopic apparatus 1 according to the first embodiment, the optical path switching unit 223 switches the optical paths by sliding the shielding member (shielding member 224) to shield either of the optical paths due to the magnetic field generated in according to the current polarity of the optical-path-switch driving signal.

In the endoscopic apparatus 1 according to the first embodiment, the insertion portion 20 is configured by the scope (scope 21) having a flexible cord and the optical adapter (optical adapter 22) attachable to and removable from the distal end side of the scope 21, the first objective optical system, the second objective optical system, and the optical path switching unit 223 is disposed inside the optical adapter 22, and the image sensor 212 is disposed at the distal end side of the scope 21.

In the endoscopic apparatus 1 according to the first embodiment, the optical path switching controller 114 informs the determination result when the optical path switching controller 114 determines that it is impossible to switch the optical paths.

A control method of the endoscopic apparatus (endoscopic apparatus 1) according to the first embodiment, the endoscopic apparatus having the insertion portion (insertion portion 20) formed to extend in a longitudinal direction along a predetermined central axis and have a distal end portion; an optical path switching means (optical path switching unit 223 and shielding member 224) disposed inside the insertion portion 20 and configured to switch optical paths such that either of a first objective image (for example the objective image equivalent to the image captured by the right eye) of an object or a second objective image (for example the objective image equivalent to the image captured by the left eye) of the object is imaged on a common imaging region (capturing region), the first objective image being formed by the light (reflection light from the object) emitted from a first objective optical system (one of the objective lens 222a and the objective lens 222b) disposed in the distal end portion, the second objective image being formed by the light (reflection light from the object) emitted from a second objective optical system (the other of the objective lens 222a and the objective lens 222b) disposed in the distal end portion, and both of the first objective image and the second objective image being able to be imaged on the imaging region; an image sensor (image sensor 212) configured to capture the first objective image and the second objective image which are imaged on the imaging region; and an optical path switching controller (optical path switching controller 114) configured to control switching of the optical paths according to a state of the insertion portion 20, has a step of determining whether to switch the optical paths according to the state of the insertion portion by the optical path switching controller 114; a step of controlling the optical switching unit 223 to switch the optical paths when the optical path switching controller 114 determines that it is possible to switch the optical paths; and a step of controlling the optical switching unit 223 not to switch the optical paths when the optical path switching controller 114 determines that it is impossible to switch the optical paths.

A control program of the endoscopic apparatus 1 according to the first embodiment, the endoscopic apparatus having the insertion portion (insertion portion 20) formed to extend in a longitudinal direction along a predetermined central axis and have a distal endportion; an optical path switching means (optical path switching unit 223 and shielding member 224) disposed inside the insertion portion 20 and configured to switch optical paths such that either of a first objective image (for example the objective image equivalent to the image captured by the right eye) of an object or a second objective image (for example the objective image equivalent to the image captured by the left eye) of the object is imaged on a common imaging region (capturing region), the first objective image being formed by the light (reflection light from the object) emitted from a first objective optical system (one of the objective lens 222a and the objective lens 222b) disposed in the distal endportion, the second objective image being formed by the light (reflection light from the object) emitted from a second objective optical system (the other of the objective lens 222a and the objective lens 222b) disposed in the distal end portion, and both of the first objective image and the second objective image being able to be imaged on the imaging region; an image sensor (image sensor 212) configured to capture the first objective image and the second objective image which are imaged on the imaging region; and an optical path switching controller (optical path switching controller 114) configured to control switching of the optical paths according to a state of the insertion portion 20, causes a computer of the optical switching controller 114 of the endoscopic apparatus (endoscopic apparatus 1) to execute a processing of determining whether to switch the optical paths according to the state of the insertion portion; a processing of controlling the optical switching unit 223 to switch the optical paths when it is determined that it is possible to switch the optical paths; and a processing of controlling the optical switching unit 223 not to switch the optical paths when it is determined that it is impossible to switch the optical paths.

A non-transitory computer-readable recording medium storing the control program of the endoscopic apparatus 1 according to the first embodiment, the endoscopic apparatus having the insertion portion (insertion portion 20) formed to extend in a longitudinal direction along a predetermined central axis and have a distal end portion; an optical path switching means (optical path switching unit 223 and shielding member 224) disposed inside the insertion portion 20 and configured to switch optical paths such that either of a first objective image (for example the objective image equivalent to the image captured by the right eye) of an object or a second objective image (for example the objective image equivalent to the image captured by the left eye) of the object is imaged on a common imaging region (capturing region), the first objective image being formed by the light (reflection light from the object) emitted from a first objective optical system (one of the objective lens 222a and the objective lens 222b) disposed in the distal end portion, the second objective image being formed by the light (reflection light from the object) emitted from a second objective optical system (the other of the objective lens 222a and the objective lens 222b) disposed in the distal end portion, and both of the first objective image and the second objective image being able to be imaged on the imaging region; an image sensor (image sensor 212) configured to capture the first objective image and the second objective image which are imaged on the imaging region; and an optical path switching controller (optical path switching controller 114) configured to control switching of the optical paths according to a state of the insertion portion 20, causes the computer of the optical switching controller 114 of the endoscopic apparatus 1 to execute a processing of determining whether to switch the optical paths according to the state of the insertion portion; a processing of controlling the optical switching unit 223 to switch the optical paths when it is determined that it is possible to switch the optical paths; and a processing of controlling the optical switching unit 223 not to switch the optical paths when it is determined that it is impossible to switch the optical paths.

As described above, the endoscopic apparatus 1 according to the first embodiment of the present invention has the temperature sensor 215 at the distal end side of the scope 21, that is, in the distal end portion of the insertion portion 20. Accordingly, when the endoscopic apparatus 1 according to the first embodiment of the present invention performs the stereo measurement in response to the instructions from the user of the endoscopic apparatus 1, it is possible to measure the change of the temperature of the optical path switching unit 223 configured to move (slide) the shielding member 224 for switching the optical paths through which the light is incident on the image sensor 212. In the endoscopic apparatus 1 according to the first embodiment of the present invention, when the temperature of the optical path switching unit 223 measured by the temperature sensor 215 is determined to be lower than the predetermined temperature threshold value, the shielding member 24 is moved (slided) at the timing synchronized with the frame of the objective image captured by the image sensor 212. On the other hand, in the endoscopic apparatus 1 according to the first embodiment of the present invention, when the temperature of the optical path switching unit 223 measured by the temperature sensor 215 is determined to be equal to or higher than the predetermined temperature threshold value, the switching of the optical paths for the stereo measurement is stopped.

According to the endoscopic apparatus 1 according to the first embodiment of the present invention, it is possible to reduce the consumption power of the optical path switching unit 223 when the optical path switching unit 223 moves (slides) the shielding member 224 during the stereo measurement. Accordingly, in the endoscopic apparatus 1 according to the first embodiment of the present invention, it is possible to reduce the unnecessary heat generation in the optical path switching unit 223. Thus, in the endoscopic apparatus 1 according to the first embodiment of the present invention, for example, it is possible to reduce the possibility of damaging the mechanism of the optical path switching unit 223 and the peripheral configuration elements disposed in the vicinity of the optical path switching unit 223, in other words, the configuration elements provided at the distal end portion of the insertion portion 20 (for example, the image sensor 212 and the like), when the insertion portion 20 is inserted into a specimen with a high temperature to image the object as the measurement target such that the temperature of the optical path switching unit 223 becomes higher and exceeds a rated temperature.

According to the first embodiment of the present invention, a configuration example is shown that the optical path switching controller 114 determines whether to switch the optical paths through which the light is incident on the image sensor 212 for performing the stereo measurement according to one temperature threshold value stored in the parameter storage unit 120. However, in the endoscopic apparatus 1 according to the first embodiment of the present invention, the temperature threshold value used by the optical switching controller 114 for determining whether to switch the optical paths is not limited to a single temperature threshold value shown as above, and more temperature threshold values may be used to restrict the stereo measurement step-by-step. For example, in the endoscopic apparatus 1 according to the first embodiment of the present invention, two temperature threshold values may be prepared for the optical path switching controller 114 to determine whether to switch the optical paths. In this case, in the endoscopic apparatus 1 according to the first embodiment of the present invention, when the temperature measured by the temperature sensor 215 falls in the region between the lower temperature threshold value and the higher temperature threshold value, it is possible to switch the optical paths and perform the stereo measurement while controlling the display apparatus 30 to display a notice indicating that the temperature of the distal end portion becomes high, or it is possible to reduce the numbers of the pairs of the images (videos) of the object acquired for the stereo measurement. In this case, in the endoscopic apparatus 1 according to the first embodiment of the present invention, when the temperature measured by the temperature sensor 215 is determined to be equal to or higher than the higher temperature threshold value, it is possible to stop switching the optical paths for the stereo measurement and control the display apparatus 30 to display the warning indicating that the stereo measurement cannot be performed since the temperature of the distal end portion is high.

In the endoscopic apparatus 1 according to the first embodiment of the present invention, the configuration of providing the temperature sensor 215 in the distal end portion of the insertion portion 20 for measuring the change of the temperature of the optical path switching unit 223 is described. However, the configuration for measuring the change of the temperature of the optical path switching unit 223 is not limited to the configuration having the temperature sensor 215 described above. For example, the temperature change of the optical path switching unit 223 can be estimated from a change of luminance information indicated by the pixel signal which is generated by capturing the objective image and output by the image sensor 212, a change of the noise amount included in the pixel signal, and a change of the waveform of the pixel signal. This is because that when the image sensor 212 provided in the distal end portion of the insertion portion 20 becomes extremely hot due to the heat generation of the optical path switching unit 223, a saturated level of the luminance indicated by the pixel signal output by the image sensor 212 is decreased, the noise amount is increased, and the change amount of the waveform (change amount of the signal level) is decreased. In this case, in the endoscopic apparatus 1 according to the first embodiment of the present invention, the system controller 110 (more specifically the optical path switching controller 114) provided in the main body 10 is configured to estimate the change of the temperature of the optical path switching unit 223 according to the pixel signal before being processed by the image-processing unit 130, in other words, according to the original pixel signal output by the image sensor 212.

Second Embodiment

Figure 3:
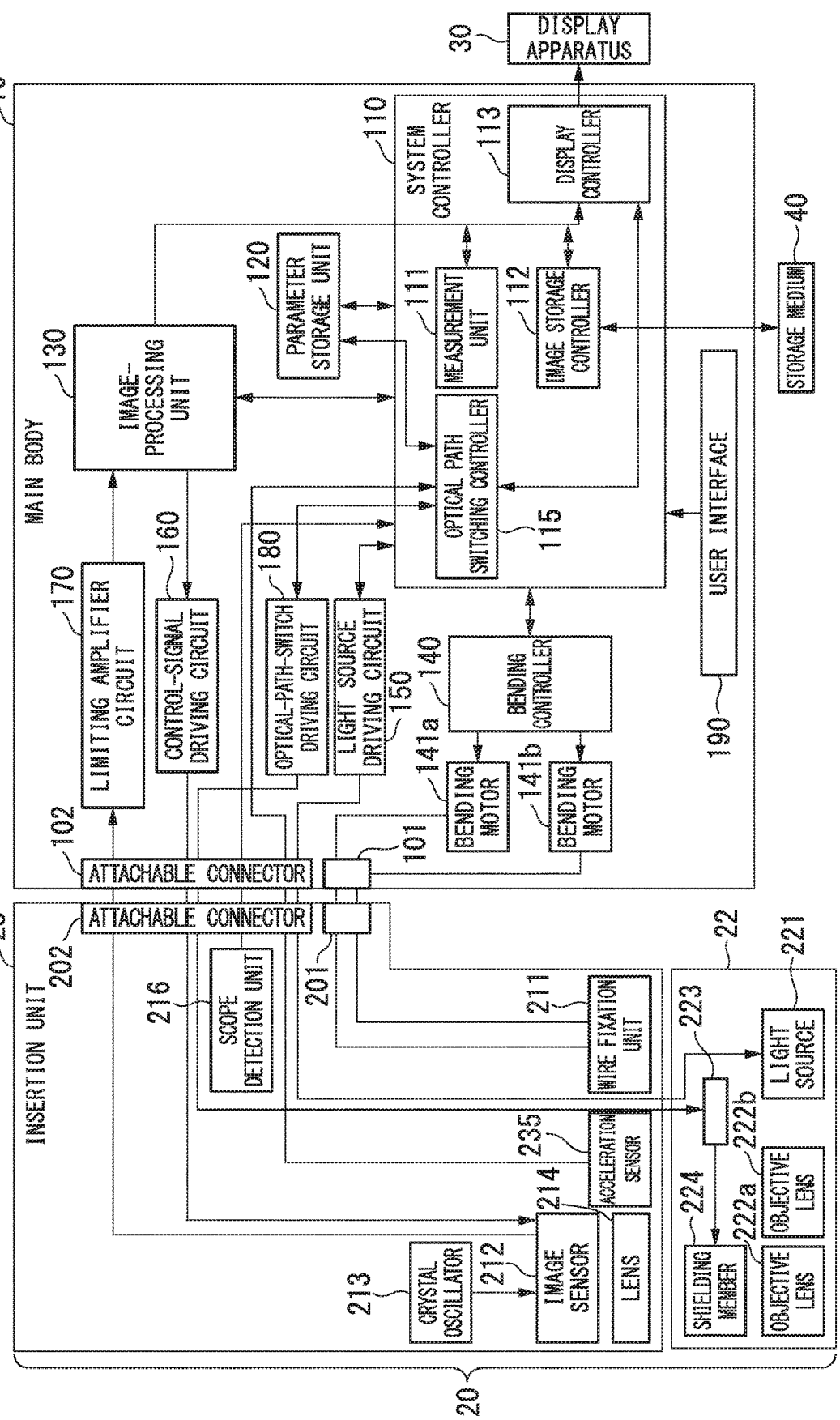
FIG. 3 is a block diagram showing a configuration of an endoscopic apparatus according to a second embodiment of the present invention.

Next, a second embodiment of the present invention will be described. An endoscopic apparatus according to the second embodiment will also be described as an industrial endoscopic apparatus. FIG. 3 is a block diagram showing a configuration of the endoscopic apparatus according to the second embodiment of the present invention. In the same way as the endoscopic apparatus 1 shown in FIG. 1, the endoscopic apparatus 2 shown in FIG. 3 has the main body 10 and the elongated insertion portion 20. In the endoscopic apparatus 2, in the same way as the endoscopic apparatus 1 according to the first embodiment, the main body 10 is connected to the display apparatus 30 and the storage medium 40.

In the same way as the endoscopic apparatus 1 according to the first embodiment, in the endoscopic apparatus 2, the distal end portion of the flexible insertion portion 20 which has the extending shape in the longitudinal direction along the predetermined central axis is inserted into the specimen so as to display the captured images (videos) of the object on the display apparatus 30 and store the data of the objective image into the storage medium 40.

The main body 10 has the system controller 110, the parameter storage unit 120, the image-processing unit 130, the bending controller 140, two bending motors 141a, 141b, the light source driving circuit 150, the control-signal driving circuit 160, the limiting amplifier circuit 170, the optical-path-switch driving circuit 180, the user interface 190, the wire connection mechanism 101, and the attachable connector 102. The system controller 110 has the measurement unit 111, the image storage controller 112, the display controller 113, and an optical path switching controller 115.

The insertion portion 20 includes a scope 23 having a flexible cord and the optical adapter 22 attachable to and removable from the distal end side of the scope 23. The scope 23 is configured to have the wire fixation unit 211, the image sensor 212, the crystal oscillator 213, the lens 214, an acceleration sensor 235, the scope detection unit 216, the wire connection mechanism 201, and the attachable connector 202. The optical adapter 202 includes a light source 221, two objective lens 222a, 222b, the optical path switching unit 223, and the shielding member 224. In the scope 23, the wire fixation unit 211, the image sensor 212, the crystal oscillator 213, the lens 214, and the acceleration sensor 235 are disposed on the distal end side thereof to which the optical adapter 22 is attached. In the description below, the distal end side of the scope 23 at which the image sensor 212 and the like are disposed and the optical adapter 22 attached to the distal end side of the scope 23 are described as the distal end portion of the insertion portion 20.

In the endoscopic apparatus 2, the temperature sensor 215 provided in the scope 21 to configure the insertion portion 20 of the endoscopic apparatus 1 according to the first embodiment is replaced with the acceleration sensor 235. Accordingly, in the endoscopic apparatus 2, the scope 21 configuring the insertion portion 20 in the endoscopic apparatus 1 according to the first embodiment is replaced with the scope 23. In the endoscopic apparatus 2, the optical path switching controller 114 in the system controller 110 provided in the main body 10 of the endoscopic apparatus 1 according to the first embodiment is replaced with the optical path switching controller 115. The endoscopic apparatus 2 is configured to control the switching of the optical paths through which the light is incident on the image sensor 212 according to a movement of the insertion portion 20 detected by the acceleration sensor 235.

Other configuration elements included in the endoscopic apparatus 2 are same with the configuration elements included in the endoscopic apparatus 1 according to the first embodiment. Accordingly, in the description below, among the configuration elements of the endoscopic apparatus 2, the configuration elements same with those included in the endoscopic apparatus 1 according to the first embodiment will be designated to the same numeral references, and a detailed description of each configuration element will be omitted. In the description below, only the configuration elements of the endoscopic apparatus 2 different from those of the endoscopic apparatus 1 according to the first embodiment will be described.

The acceleration sensor 235 is an accelerator measurement means (sensor) configured to measure a movement of the distal end portion of the insertion portion 20. The acceleration sensor 235 is configured to measure the movement of the distal end portion when the insertion portion 20 is inserted into the specimen and when the direction in which the endoscopic apparatus 2 images the object is changed. The movement of the distal end portion measured by the acceleration sensor 235 includes various information such as a movement amount (change amount) of the distal end portion and an acceleration of the movement of the distal end portion used for determining whether the distal end portion is being moved. The acceleration sensor 235 is configured to always (in real time) output (prompt) the measured information indicting the movement of the distal end portion to the main body 10 via the signal lines inside the cord. For example, the acceleration sensor 235 is configured by an accelerator sensor IC. The acceleration sensor 235 outputs the data indicating the movement of the distal end portion to the main body 10 as the movement information. At this time, for example, the acceleration sensor 235 outputs the movement information to the main body 10 by a predetermined serial communication method such as I2C and the like. The configuration of the acceleration sensor 235 is not limited to the configuration using the accelerator sensor IC described above, for example, the acceleration sensor 235 may be configured to output the data indicating the angular velocity of the distal end portion as the movement information using a gyro sensor and the like.

In the endoscopic apparatus 2, in the same way as the endoscopic apparatus 1 according to the first embodiment, the stereo measurement of the object inside the specimen is performed by the configuration of the insertion portion 20, that is, by the configuration of the optical adapter 22 attached to the distal end portion of the scope 23. Accordingly, in the endoscopic apparatus 2, the system controller 110 is configured to control the stereo photographing of the object in response to the measurement instructions input by the operations of the user of the endoscopic apparatus 2 with respect to the user interface 190. During the stereo measurement in the endoscopic apparatus 2, in the same way as the stereo measurement in the endoscopic apparatus 1 according to the first embodiment, the optical paths of the reflection light from the object and incident on the image sensor are switched in time series. In the endoscopic apparatus 2, instead of the optical path switching controller 114 included in the system controller 110 of the endoscopic apparatus 1 according to the first embodiment, the optical path switching controller 115 included in the system controller 110 is configured to control the switching of the optical paths of the light incident on the image sensor 212 in time series.

The optical path switching controller 115 is configured to output the optical-path-switch driving signal to the optical path switching unit 223, wherein the optical-path-switch driving signal is used for controlling the speed and timing of the switching of the optical paths of the light emitted from the optical path switching unit 223 disposed at the distal end portion of the insertion portion 20 (more specifically the optical adapter 22 attached to the distal end side of the scope 21) to the image sensor 212 in time series, in the same way as the optical path switching controller 114. At this time, in the same way as the optical path switching controller 114, the optical path switching controller 115 outputs the optical-path-switch driving signal for switching the optical paths of the light incident on the image sensor 212 to the optical path switching unit 223 at a timing synchronized with the capturing timing of the objective image by the image sensor 212 according to the information of the control signal acquired from the image-processing unit 130, in the same way as the optical path switching controller 114. In other words, in the same way as the optical path switching controller 114, the optical path switching controller 115 is configured to output the optical-path-switch driving signal for switching the optical paths of the light incident on the image sensor 212 to the optical path switching unit 223 during the pixel-signal-read period of the image sensor 212. In the endoscopic apparatus 2, in the same way as the endoscopic apparatus 1 according to the first embodiment, since the insertion portion 20 (more specifically the scope 23) is extremely long, for the same reason in the endoscopic apparatus 1 according to the first embodiment, in the same way as the optical path switching controller 114, the optical path switching controller 115 outputs the optical-path-switch driving signal for the optical path switching unit 223 to the optical-path-switch driving circuit 180. Accordingly, the optical path switching unit 223 can cause the reflection light from the object and incident on whole of the imaging region of the image sensor 212 to be switched to the reflection light from the object and transmitted through either of the optical paths of the objective lens 222a or the objective lens 222b indicated by the optical-path-switch driving signal at the timing synchronized with the image sensor 212.

In the endoscopic apparatus 2, in the same way as the endoscopic apparatus 1 according to the first embodiment, the configuration of switching the optical paths of the reflection light from the object and incident on the image sensor 212 by the optical path switching unit 223 in the optical adapter 22 attached to the distal end side of the scope 23 is not limited thereto as described above. In other words, in the same way as the endoscopic apparatus 1 according to the first embodiment, the endoscopic apparatus 2 may be configured such that the optical path switching controller 115 outputs the optical-path-switch control signal to the optical-path-switch driving circuit 180 and the optical-path-switch driving circuit 180 generates the optical-path-switch driving signal for controlling the optical path switching unit 223 to switch the optical paths according to the speed and timing indicated by the optical-path-switch control signal output by the optical path switching controller 115.

In the same way as the optical path switching controller 114, the optical path switching controller 115 informs the display controller 113 with that the optical-path-switch driving signal is output to the optical path switching unit 223. Accordingly, in the endoscopic apparatus 2, in the same way as the endoscopic apparatus 1 according to the first embodiment, the display controller 113 can control the display apparatus 30 to display the images (videos) of a pair, that is, two frames of images (videos) of the object inside the specimen generated by the image-processing unit 130 as the image (video) equivalent to the image captured by the right eye and the image (video) equivalent to the image captured by the left eye.

In the same way as the optical path switching controller 114, the optical path switching controller 115 controls the output of the optical-path-switch driving signal to the optical path switching unit 223. However, the optical path switching controller 115 is configured to control the output of the optical-path-switch driving signal to the optical path switching unit 223 according to the movement information indicating the movement of the distal end portion of the insertion portion 20 which is measured by the acceleration sensor 235 provided at the distal end portion of the insertion portion 20 (more specifically at the distal end side of the scope 23). In other words, the optical path switching controller 115 is configured to determine whether to switch the optical paths of the light incident on the image sensor 212 for the stereo measurement according to the movement of the distal end-portion of the insertion portion 20 instead of the temperature of the distal end portion of the insertion portion 20 used by the optical path switching controller 114 to determine whether to switch the optical paths, and the optical path switching controller 115 is configured to control the output of the optical-path-switch driving signal to the optical path switching unit 223 according to the determination result. At this time, the optical path switching controller 115 is configured to determine whether to switch the optical paths of the light incident on the image sensor 212 according to the predetermined movement threshold value of the distal end portion which is stored in the parameter storage unit 120.

Figure 4:
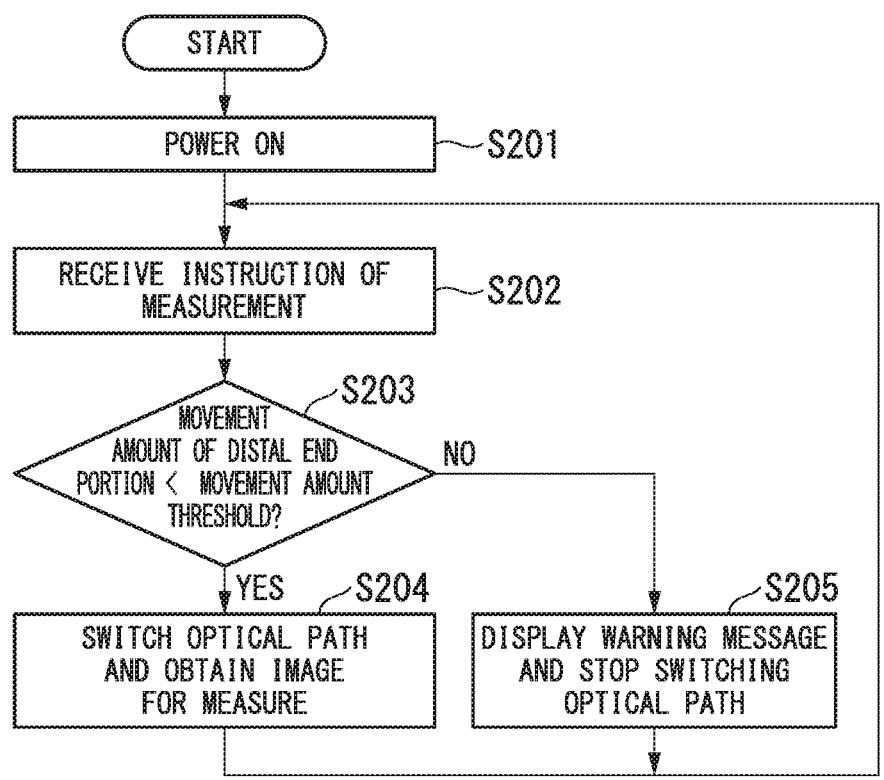
FIG. 4 is a flowchart showing a processing sequence of optical path switching in the endoscopic apparatus according to the second embodiment of the present invention.

Next, the control method of the optical path switching during the stereo photographing in the endoscopic apparatus 2 according to the second embodiment will be described. FIG. 4 is a flowchart showing an example of a processing sequence for optical path switching in the endoscopic apparatus 2 according to the second embodiment of the present invention. In FIG. 4, in the same way as the processing of switching the optical paths in the endoscopic apparatus 1 according to the first embodiment shown in FIG. 1, the control method of determining whether to perform the stereo photographing by the optical path switching controller 113 provided in the system controller 110 in the main body 10 and the method of controlling the optical path switching unit 223 provided at the optical adapter 22 attached to the distal end portion of the scope 23 according to the determination result are shown.

The main body 10 is activated when the optical adapter 22 is attached to the distal end portion of the scope 23 and the power is on (Step S201). However, each operation in Step S201 is same as each operation in Step S101 during the processing of switching the optical paths in the endoscopic apparatus 1 according to the first embodiment shown in FIG. 2. Thus, description of each operation in Step S201 in detail will be omitted.

Subsequently, the user of the endoscopic apparatus 2 inserts the distal endportion of the insertion portion 20 into the specimen while confirming the current objective image (video) displayed on the display apparatus 30. The user of the endoscopic apparatus 1 operates the user interface 190 to instruct the stereo measurement of the object when the distal end portion of the insertion portion 20 reaches the position of the object as the measurement target and the measurement target is displayed on the display apparatus 30. Accordingly, the user interface 190 receives the instructions of the stereo measurement by the operations of the user of the endoscopic apparatus 2 and outputs the information representing the received instructions from the user to the system controller 110 (Step S202). The system controller 110 activates the optical path switching controller 115 in response to the instructions of the stereo measurement by the user of the endoscopic apparatus 2 input from the user interface 190 such that functions of the optical path switching controller 115 are started.

When the functions of the optical path switching controller 115 are started, firstly, the optical path switching controller 115 acquires the movement information representing the movement of the distal end portion which is measured by the acceleration sensor 235. Also, the optical path switching controller 115 acquires the movement threshold value stored in the parameter storage unit 120. The movement threshold value is a value representing a state in which the movement of the distal end portion is stopped, and the movement threshold value is the value used for determining whether the movement of the distal endportion is suitable for performing the stereo measurement. Here, the state in which the movement of the distal end portion is stopped includes a state in which the object can be imaged without any blurring of the image using the existing image stabilization technology, for example. In other words, the state in which the movement of the distal end portion is stopped is not necessary to be a state in which the distal endportion is still. The optical path switching controller 115 determines whether the movement of the distal end portion is smaller than the movement threshold value according to the acquired movement information and the movement threshold value (Step S203).

When the determination result of the Step S203 is that the movement of the distal end portion is smaller than the movement threshold value ("YES" in the Step S203), the optical path switching controller 115 determines that the stereo measurement in response to the instructions from the user of the endoscopic apparatus 2 can be performed in this state. In this case, the optical path switching controller 115 determines whether to switch the optical paths through which the light incident on the image sensor 212 in time series, and the optical path switching controller 115 outputs the optical-path-switch driving signal to the optical path switching unit 223 via the optical-path-switch driving circuit 180 and the corresponding signal lines. Accordingly, the system controller 110 acquires the pair of the images (videos) of the object for the measurement by capturing the reflection light from the object through the optical path which is switched by the optical path switching unit 223 (Step S204). Each operation in Step S204 is same as each operation in Step S104 during the processing of switching the optical paths in the endoscopic apparatus 1 according to the first embodiment shown in FIG. 2. Thus, description of each operation in Step S204 in detail will be omitted.

Accordingly, in the same way as the endoscopic apparatus 1 according to the first embodiment, in the endoscopic apparatus 2, the system controller 110 (more specifically the measurement unit 111) can perform the stereo measurement according to the pair of images (videos) generated by the image-processing unit 130. Also, in the same way as the endoscopic apparatus 1 according to the first embodiment, in the endoscopic apparatus 2, the system controller 110 (more specifically the display controller 113) can superimpose the information of the stereo measurement result by the measurement unit 111 on the pair of the images (videos) of the object generated by the image-processing unit 130 and controls the display apparatus 30 to display them.

In the same way as the optical path switching controller 114, the optical path switching controller 115 may increase the times of outputting the optical-path-switch driving signals for switching the optical paths of the light incident on the image sensor 212. Accordingly, in the same way as the endoscopic apparatus 1 according to the first embodiment, in the endoscopic apparatus 2, the image-processing unit 130 can generate multiple pairs of the images (videos) for the stereo measurement so as to improve the precision of the stereo measurement by the measurement unit 111.

On the other hand, when the determination result of the Step S203 is that the movement of the distal end portion is equal to or larger than the movement threshold value ("No" in the Step S203), the optical path switching controller 115 determines that the stereo measurement in response to the instructions from the user of the endoscopic apparatus 2 cannot be performed in this state. In this case, the optical path switching controller 115 determines that the optical paths through which the light incident on the image sensor 212 cannot be switched in time series, and the optical path switching controller 115 informs the display controller 113 with the state in which the stereo measurement cannot be performed. Accordingly, the display controller 113 controls the display apparatus 30 to display a warning message indicating that the stereo measurement cannot be performed due to a large (a lot of) movement of the distal end portion. Also, the optical path switching controller 115 does not output the optical-path-switch driving signal for switching the optical paths through which the light incident on the image sensor 212 to the optical path switching unit 223, and the optical path switching controller 115 stops switching the optical paths for the stereo measurement in response to the instructions from the user of the endoscopic apparatus 2 (Step S205). In other words, the optical path switching controller 115 does not change the polarity of the current output as the optical-path-switch driving signal, that is, the optical path switching controller 115 makes the polarity of the current output as the optical-path-switch driving signal to be "0" to control the optical path switching unit 223 to maintain the current state in which the shielding member 224 is moved to be on either of the optical path of the light emitted by the objective lens 222a or the optical path of the light emitted by the objective lens 222b. Accordingly, in the same way as the endoscopic apparatus 1 according to the first embodiment, in the endoscopic apparatus 2, the consumption power of moving (sliding) the shielding member 224 by the optical path switching unit 223 is reduced.

Thereafter, the system controller 110 returns to Step S202 to repeat the processing from the Step S203 to Step S205 every time when the instruction of the stereo measurement input by the operations of the user of the endoscopic apparatus 2 is received. That is, the system controller 110 determines the movement of the distal end portion ever time when the instruction of the stereo measurement input by the operations of the user of the endoscopic apparatus 2 is received, and the system controller 110 controls the endoscopic apparatus 2 to perform the stereo measurement in response to the instruction from the user of the endoscopic apparatus 2 only when the movement of the distal end portion is determined to be smaller than the movement threshold value.

According to the second embodiment, the endoscopic apparatus (endoscopic apparatus 2) is configured that the measurement means (acceleration sensor 235) prompts the measurement information (movement information) by measuring the movement of the distal end portion of the insertion portion (insertion portion 20), and the optical path switching controller (optical path switching controller 115) determines whether to switch the optical paths when the movement of the distal end portion indicated by the movement information is determined to be smaller than the predetermined movement threshold value, and the optical path determines that the optical paths cannot be switched when the movement of the distal end portion indicated by the movement information is determined to be equal to or larger than the movement threshold value.

As described above, the endoscopic apparatus 2 according to the second embodiment is configured to have the acceleration sensor 235 at the distal end portion of the insertion portion 20. Accordingly, the endoscopic apparatus 2 according to the second embodiment can measure the movement of the distal end portion of the insertion portion 2, that is, the endoscopic apparatus 2 according to the second embodiment can measure the object shake. In the endoscopic apparatus 2 according to the second embodiment, when the movement of the distal end portion measured by the acceleration sensor 235 is determined to be smaller than the predetermined movement threshold value, the shielding member 224 is moved (slided) at the timing synchronized with the timing when the frame of the objective image is captured by the image sensor 212. On the other hand, when the movement of the distal end portion measured by the acceleration sensor 235 is determined to be equal to or larger than the predetermined movement threshold value, switching the optical paths for the stereo measurement is stopped. Accordingly, in the endoscopic apparatus 2 according to the second embodiment, when the stereo measurement cannot be performed, it is possible to prevent unnecessary photographing of the object in response to the instructions from the user of the endoscopic apparatus 2 and thus it is possible to reduce the consumption power of the optical path switching unit 223 to move (slide) the shielding member 224. In the endoscopic apparatus 2 according to the second embodiment, since the switching of the optical paths is stopped when the movement of the distal end portion of the insertion portion 20 is large, that is, moving (sliding) the shielding member 224 by the optical path switching unit 223 is stopped, for example, even if in a situation that a strong impact is applied to the distal end portion when the insertion portion 20 is inserted into the specimen or the photographing direction for the object is changed, the possibility of mechanically damaging the mechanism of the optical path switching unit 223 and the shielding member 224 is limited to be low.

In the same way as the endoscopic apparatus 1 according to the first embodiment, a configuration example is shown that the optical path switching controller 115 determines whether to switch the optical paths through which the light is incident on the image sensor 212 for performing the stereo measurement according to one movement threshold value stored in the parameter storage unit 120. However, in the same way as the endoscopic apparatus 1 according to the first embodiment, in the endoscopic apparatus 2 according to the second embodiment of the present invention, the movement threshold value used by the optical switching controller 115 for determining whether to switch the optical paths, is not limited to a single movement threshold value shown as above, and more movement threshold values may be used to restrict the stereo measurement step-by-step. For example, in the endoscopic apparatus 2 according to the second embodiment of the present invention, in the same way as the endoscopic apparatus 1 according to the first embodiment, two movement threshold values may be prepared for the optical path switching controller 114 to determine whether to switch the optical paths. In this case, in the endoscopic apparatus 2 according to the second embodiment of the present invention, when the movement measured by the acceleration sensor 235 falls in the region between the smaller movement threshold value and the larger movement threshold value, it is possible to switch the optical paths and perform the stereo measurement while controlling the display apparatus 30 to display a notice indicating that the object being imaged is shaking, or it is possible to reduce the numbers of the pairs of the images (videos) of the object acquired for the stereo measurement. In this case, in the endoscopic apparatus 2 according to the second embodiment of the present invention, when the movement measured by the acceleration sensor 235 is determined to be equal to or higher than the larger movement threshold value, as described above, it is possible to stop switching the optical paths for the stereo measurement and control the display apparatus 30 to display the warning indicating that the stereo measurement cannot be performed since the movement of the distal end portion is large.

In the endoscopic apparatus 2 according to the second embodiment of the present invention, the configuration of providing the acceleration sensor 235 in the distal end portion of the insertion portion 20 for measuring the movement of the distal end portion of the insertion portion 20 (shaking of the object) is described. However, in the endoscopic apparatus 2 according to the second embodiment, when the insertion portion 20 is inserted into the specimen and the object is photographed, the movement and the direction of the distal end portion are controlled by the main body 10 (more specifically the system controller 110). Accordingly, in the endoscopic apparatus 2 according to the second embodiment, it is possible to estimate the movement of the distal end portion of the insertion portion 20 (shaking of the object) according to the information of the bending control signal for controlling the movement and the direction of the distal end portion which is output by the system controller to the bending controller 140. In this case, in the endoscopic apparatus 2 according to the second embodiment, it is possible to use the information of the bending control signal besides or instead of the movement information measured and output by the acceleration sensor 235 provided in the distal end portion of the insertion portion 20.

Third Embodiment

Figure 5:
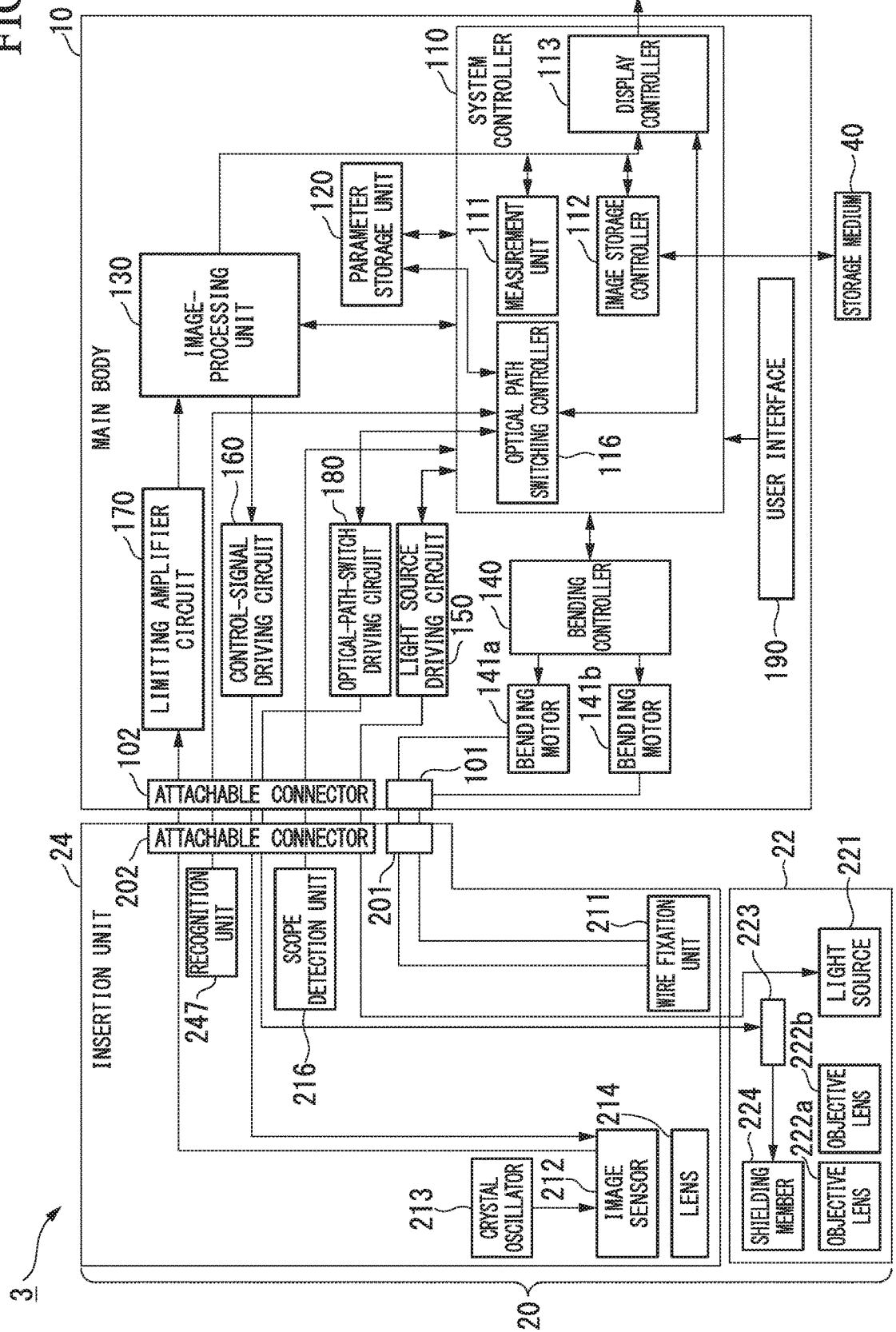
FIG. 5 is a block diagram showing a configuration of an endoscopic apparatus according to a third embodiment of the present invention.

Next, a third embodiment of the present invention will be described. An endoscopic apparatus according to the third embodiment will also be described as an industrial endoscopic apparatus. FIG. 5 is a block diagram showing a configuration of the endoscopic apparatus according to the third embodiment of the present invention. In the same way as the endoscopic apparatus 1 shown in FIG. 1 and the endoscopic apparatus 2 shown in FIG. 3, the endoscopic apparatus 3 shown in FIG. 5 has the main body 10 and the elongated insertion portion 20. In the endoscopic apparatus 3, in the same way as the endoscopic apparatus 1 according to the first embodiment and the endoscopic apparatus 2 according to the second embodiment, the main body 10 is connected to the display apparatus 30 and the storage medium 40.

In the same way as the endoscopic apparatus 1 according to the first embodiment and the endoscopic apparatus 2 according to the second embodiment, in the endoscopic apparatus 3, the distal end portion of the flexible insertion portion 20 which has the extending shape in the longitudinal direction along the predetermined central axis is inserted into the specimen so as to display the captured images (videos) of the object on the display apparatus 30 and store the data of the objective image into the storage medium 40.

The main body 10 has the system controller 110, the parameter storage unit 120, the image-processing unit 130, the bending controller 140, two bending motors 141a, 141b, the light source driving circuit 150, the control-signal driving circuit 160, the limiting amplifier circuit 170, the optical-path-switch driving circuit 180, the user interface 190, the wire connection mechanism 101, and the attachable connector 102. The system controller 110 has the measurement unit 111, the image storage controller 112, the display controller 113, and an optical path switching controller 116.

The insertion portion 20 includes a scope 24 having a flexible cord and the optical adapter 22 attachable to and removable from the distal end side of the scope 24. The scope 24 is configured to have the wire fixation unit 211, the image sensor 212, the crystal oscillator 213, the lens 214, the scope detection unit 216, a recognition unit 247, the wire connection mechanism 201, and the attachable connector 202. The optical adapter 202 includes the light source 221, two objective lens 222a, 222b, the optical path switching unit 223, and the shielding member 224. In the scope 24, the wire fixation unit 211, the image sensor 212, the crystal oscillator 213, and the lens 214 are disposed at the distal end side thereof to which the optical adapter 22 is attached. In the description below, the distal end side of the scope 24 at which the image sensor 212 and the like are disposed and the optical adapter 22 attached to the distal end side of the scope 24 are described as the distal end portion of the insertion portion 20.

The endoscopic apparatus 3 has the scope 24 instead of the scope 21 configuring the insertion portion 20 in the endoscopic apparatus 1 according to the first embodiment and the scope 23 configuring the insertion portion 20 in the endoscopic apparatus 2 according to the second embodiment. The endoscopic apparatus 3 has the recognition unit 247 in the scope 24 configuring the insertion portion 20. In the endoscopic apparatus 3, the temperature sensor 215 included in the scope 21 configuring the insertion portion 20 in the endoscopic apparatus 1 according to the first embodiment and the acceleration sensor 235 included in the scope 23 configuring the insertion portion 20 in the endoscopic apparatus 2 according to the second embodiment are removed from the scope 24 configuring the insertion portion 20. In the endoscopic apparatus 3, the optical path switching controller 114 of the system controller 110 included in the main body of the endoscopic apparatus 1 according to the first embodiment and the optical path switching controller 115 of the system controller 110 included in the main body 10 of the endoscopic apparatus 2 according to the second embodiment are replaced with the optical path switching controller 116. The endoscopic apparatus 3 is configured to control the switching of the optical paths of the light incident on the image sensor according to a type of the scope 24 indicated by the recognition unit 247.

Other configuration elements included in the endoscopic apparatus 3 are same with the configuration elements included in the endoscopic apparatus 1 according to the first embodiment and the endoscopic apparatus 2 according to the second embodiment. Accordingly, in the description below, among the configuration elements of the endoscopic apparatus 3, the configuration elements same with those included in the endoscopic apparatus 1 according to the first embodiment and the endoscopic apparatus 2 according to the second embodiment will be designated to same numeral references, and a detailed description of each configuration element will be omitted. In the description below, only the configuration elements of the endoscopic apparatus 3 different from those of the endoscopic apparatus 1 according to the first embodiment and the endoscopic apparatus 2 according to the second embodiment will be described.

The recognition unit 247 is a recognition means configured to prompt information for recognizing the type (function and performance) of the insertion portion 20. The recognition unit 247 is configured to at least prompt the information for recognizing the type (function and performance) of the image sensor 212 included in the scope 24. For example, the recognition unit 247 is configured by a resistance element having an exclusive predetermined fixed resistance value corresponding to each type of the scope 24, that is, each type of the image sensor 212 included in the scope 24. The configuration of the recognition unit 247 is not limited to the configuration of using the resistance element described above, for example, the recognition unit 247 may be configured by various memories such as a ROM, an EPROM, a flash memory and the like.

In the endoscopic apparatus 3, in the same way as the endoscopic apparatus 1 according to the first embodiment and the endoscopic apparatus 2 according to the second embodiment, the stereo measurement of the object inside the specimen is performed by the configuration of the insertion portion 20, that is, by the configuration of the optical adapter 22 attached to the distal end portion of the scope 23. Accordingly, in the endoscopic apparatus 3, the system controller 110 is configured to control the stereo photographing of the object in response to the measurement instructions input by the operations of the user of the endoscopic apparatus 3 with respect to the user interface 190. During the stereo measurement in the endoscopic apparatus 3, in the same way as the stereo measurement in the endoscopic apparatus 1 according to the first embodiment and the endoscopic apparatus 2 according to the second embodiment, the optical paths of the reflection light from the object and incident on the image sensor are switched in time series. In the endoscopic apparatus 3, instead of the optical path switching controller 114 included in the system controller 110 of the endoscopic apparatus 1 according to the first embodiment and the optical path switching controller 115 included in the system controller 110 of the endoscopic apparatus 2 according to the second embodiment, the optical path switching controller 116 included in the system controller 110 is configured to control the switching of the optical paths of the light incident on the image sensor 212 in time series.

The optical path switching controller 116 is configured to output the optical-path-switch driving signal to the optical path switching unit 223, wherein the optical-path-switch driving signal is used for controlling the speed and timing of the switching of the optical paths of the light emitted from the optical path switching unit 223 disposed at the distal end portion of the insertion portion 20 (more specifically the optical adapter 22 attached to the distal end side of the scope 24) to the image sensor 212 in time series, in the same way as the optical path switching controller 114 and the optical path switching controller 115. At this time, in the same way as the optical path switching controller 114 and the optical path switching controller 115, the optical path switching controller 116 outputs the optical-path-switch driving signal for switching the optical paths of the light incident on the image sensor 212 to the optical path switching unit 223 at a timing synchronized with the capturing timing of the objective image by the image sensor 212 according to the information of the control signal acquired from the image-processing unit 130, in the same way as the optical path switching controller 114. In other words, in the same way as the optical path switching controller 114 and the optical path switching controller 115, the optical path switching controller 116 is configured to output the optical-path-switch driving signal for switching the optical paths of the light incident on the image sensor 212 to the optical path switching unit 223 during the pixel-signal-read period of the image sensor 212. In the endoscopic apparatus 3, in the same way as the endoscopic apparatus 1 according to the first embodiment and the endoscopic apparatus 2 according to the second embodiment, since the insertion portion 20 (more specifically the scope 24) is extremely long, in the same way as the optical path switching controller 114 and the optical path switching controller 115, the optical path switching controller 116 outputs the optical-path-switch driving signal for the optical path switching unit 223 to the optical-path-switch driving circuit 180. Accordingly, the optical path switching unit 223 can cause the reflection light from the object and incident on whole of the imaging region of the image sensor 212 to be switched to the reflection light from the object and transmitted through either of the optical paths of the objective lens 222a or the objective lens 222b indicated by the optical-path-switch driving signal at the timing synchronized with the image sensor 212.

In the endoscopic apparatus 3, in the same way as the endoscopic apparatus 1 according to the first embodiment and the endoscopic apparatus 2 according to the second embodiment, the configuration of switching the optical paths of the reflection light from the object and incident on the image sensor 212 by the optical path switching unit 223 in the optical adapter 22 attached to the distal end side of the scope 24 is not limited thereto as described above. In other words, in the same way as the endoscopic apparatus 1 according to the first embodiment and the endoscopic apparatus 2 according to the second embodiment, the endoscopic apparatus 3 may be configured such that the optical path switching controller 116 outputs the optical-path-switch control signal to the optical-path-switch driving circuit 180 and the optical-path-switch driving circuit 180 generates the optical-path-switch driving signal for controlling the optical path switching unit 223 to switch the optical paths according to the speed and timing indicated by the optical-path-switch control signal output by the optical path switching controller 115.

In the same way as the optical path switching controller 114 and the optical path switching controller 115, the optical path switching controller 116 informs the display controller 113 with that the optical-path-switch driving signal is output to the optical path switching unit 223. Accordingly, in the endoscopic apparatus 3, in the same way as the endoscopic apparatus 1 according to the first embodiment and the endoscopic apparatus 2 according to the second embodiment, the display controller 113 can control the display apparatus 30 to display the images (videos) of a pair, that is, two frames of images (videos) of the object inside the specimen generated by the image-processing unit 130 as the image (video) equivalent to the image captured by the right eye and the image (video) equivalent to the image captured by the left eye.

In the same way as the optical path switching controller 114 and the optical path switching controller 115, the optical path switching controller 116 controls the output of the optical-path-switch driving signal to the optical path switching unit 223. At this time, the optical path switching controller 116 is configured to control the output of the optical-path-switch driving signal to the optical path switching unit 223 according to the type of the insertion portion 20 (more specifically, the type of the image sensor 212 included in the scope 24) connected to the main body 10. Accordingly, the optical path switching controller 116 recognizes the type of the scope 24, in other words, the type of the image sensor 212 included in the scope 24 by recognizing the recognition unit 247 included in the scope 24. For example, in a case in which the recognition unit 247 is configured by the resistance element having the predetermined fixed resistance value, the optical path switching controller 116 is configured to recognize the type of the scope 24 (the type of the image sensor 212) connected to the main body 10 by measuring a voltage value indicating the resistance value of the recognition unit 247. For example, in a case in which the recognition unit 247 is configured by the memory, the optical path switching controller 116 is configured to recognize the type of the scope 24 (the type of the image sensor 212) connected to the main body 10 by reading information (data) stored in the recognition unit 247 for indicating the type of the scope 24 (type of the image sensor 212).

The optical path switching controller 116 is configured to determine the frame rate by which the image sensor 212 captures the objective image, a blanking period when the image sensor 212 captures the objective image from the recognized type of the scope 24 (image sensor 212) and the like. This is because a period during which the optical path switching unit 223 can switch the optical paths of the light incident on the image sensor 212 varies, in other words, the speed of moving (sliding) the shielding member 224 by the optical path switching unit 223 varies, due to the frame rate by which the image sensor 212 captures the objective image and the blanking period when the image sensor 212 captures the objective image.

In the description below, the optical path switching controller 116 is described to be capable of recognizing at least the frame rate of the image sensor 212 (such as 60 frames per second (fps) and 30 frames per second (fps)). In the description below, the image sensor 212 having the frame rate of 60 fps is called a high-speed image sensor 212, and the image sensor 212 having the frame rate of 30 fps is called a low-speed image sensor 212. As described above, the optical path switching controller 116 is configured to output the optical-path-switch driving signal for switching the optical paths of the light incident on the image sensor 212 to the optical path switching unit 223 during the pixel-signal-read period of the image sensor 212. For example, the pixel-signal-read period of the image sensor 212 is equivalent to the blanking period of the image sensor 212 such that it is considerable that the pixel-signal period of the low-speed image sensor 212 having the frame rate of 30 fps is longer than that of the high-speed image sensor 212 having the frame rate of 60 fps. In this case, it is possible to make the period when the optical path switching unit 223 corresponding to the low-speed image sensor 212 moves (slides) the shielding member 224 to be longer than that of the high-speed image sensor 212. Accordingly, the optical path switching controller 116 can output the optical-path-switch driving signal for switching the optical paths at a relative low speed when the image sensor 212 included in the scope 24 is the low-speed image sensor 212 than the speed in the case when the image sensor 212 included in the scope 24 is the high-speed image sensor 212.

The speed of switching the optical paths of the light incident on the image sensor 212 can be controlled by the current values of the optical-path-switch driving signals output with polarities respectively. In other words, it is possible to increase the current value of the optical-path-switch driving signal so as to accelerate moving (sliding) the shielding member 224 by the optical path switching unit 223 and increase the speed of the switching of the optical paths. On the other hand, it is possible to decrease the current value of the optical-path-switch driving signal so as to decelerate moving (sliding) the shielding member 224 by the optical path switching unit 223 and decrease the speed of the switching of the optical paths.

Accordingly, the optical path switching controller 116 is configured to control the current value of the optical-pathswitch driving signal output to the optical path switching unit 223 according to the recognized type of the insertion portion 20 (more specifically the type of the image sensor 212 included in the scope 24) connected to the main body 10. In other words, in a case when the optical path switching controller 116 recognized that the image sensor 212 included in the scope 24 is the low-speed image sensor 212, the optical path switching controller 116 can output the optical-path-switch driving signals with low current values having polarities to the optical path switching unit 223. Accordingly, in the endoscopic apparatus 3, in the case when the type of the insertion portion 20, that is, the type of the image sensor 212 included in the scope 24, connected to the main body 10 is the low-speed image sensor 212, the consumption power of moving (sliding) the shielding member 224 by the optical path switching unit 223 during the stereo measurement can be reduced.

Figure 6:
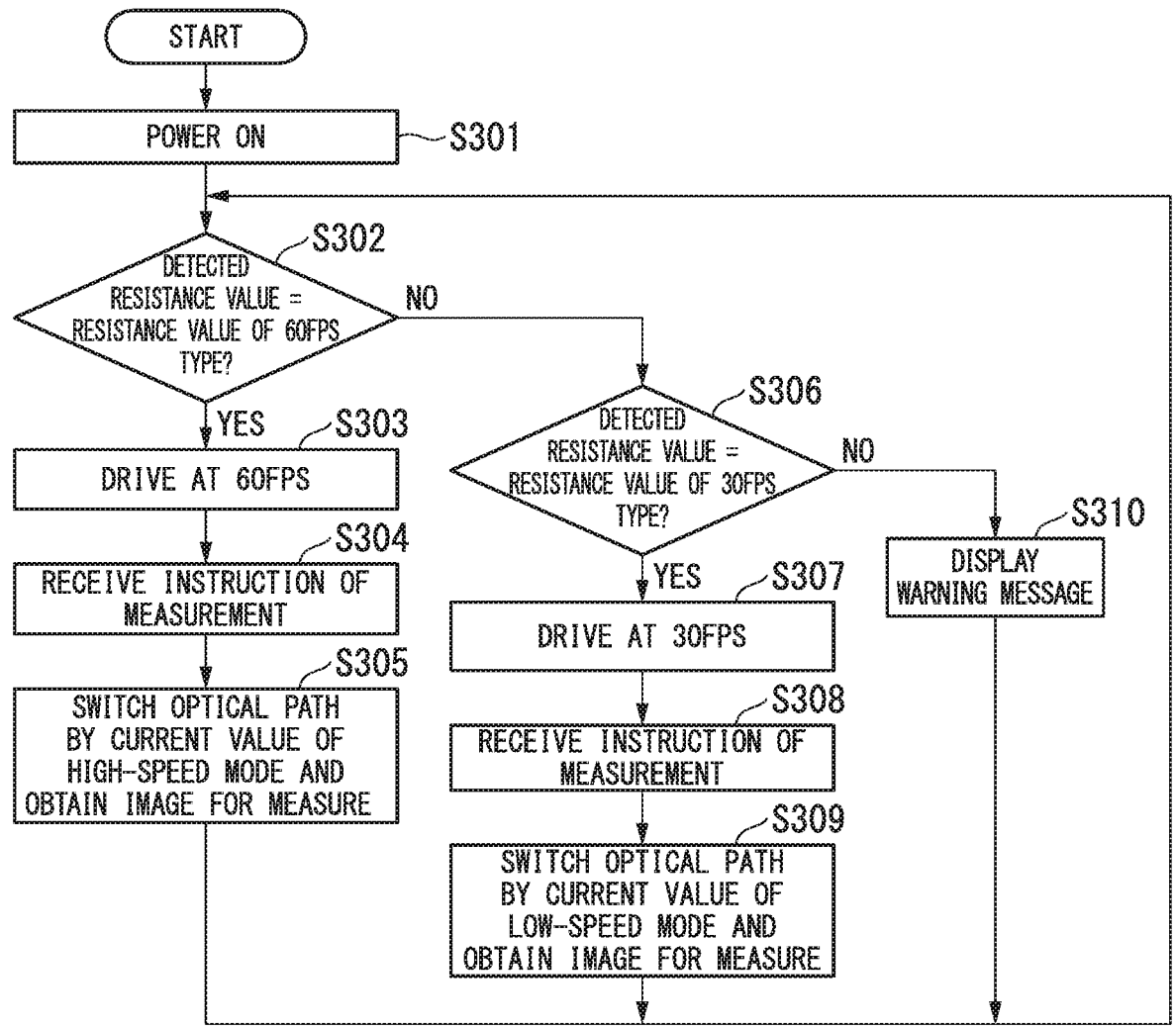
FIG. 6 is a flowchart showing a processing sequence of optical path switching in the endoscopic apparatus according to the third embodiment of the present invention.

Next, the control method of the optical path switching during the stereo photographing in the endoscopic apparatus 3 according to the third embodiment will be described. FIG. 6 is a flowchart showing an example of a processing sequence for optical path switching in the endoscopic apparatus 3 according to the third embodiment of the present invention. In FIG. 6, the method of recognizing the frame rate by which the image sensor 212 included in the connected scope 24 captures the objective images, and the method of controlling the current values of the optical-path-switch driving signals output to the optical path switching unit 223 included in the optical adapter 22 attached to the distal end side of the scope 23 according to the recognized frame rate of the image sensor 212 during the stereo photographing, which are performed by the optical path switching controller 116 included in the system controller 110 inside the main body 10 are shown. In the description below, the example of configuring the recognition unit 247 by the resistance element having the predetermined fixed resistance value will be described. In the case when the recognition unit 247 is configured by the resistance element, as described above, the optical path switching controller 116 is configured to recognize the type of the scope 24 (type of the image sensor 212) connected to the main body 10 by determining the voltage value indicating the resistance value of the recognition unit 247. However, in order to easily and simply describe the processing of switching the optical paths in the endoscopic apparatus 3 according to the third embodiment shown in FIG. 6, it will be described that the optical path switching controller 116 determines the resistance value of the recognition unit 247.

The main body 10 is activated when the optical adapter 22 is attached to the distal end portion of the scope 24 and the power is on (Step S301). Accordingly, the system controller 110 provided at the main body 10 reads the data of the program and setting values stored in the parameter storage unit 120 so as to activate the optical path switching controller 116 and start the operations of the optical path switching controller 116 corresponding to the read program.

When the operations of the optical path switching controller 116 are started, firstly, the optical path switching controller 116 determines the resistance value of the recognition unit 247 provided in the scope 24 connected to the main body 10. The optical path switching controller 116 determines whether the resistance value of the recognition unit 247 is the resistance value of the 60 fps type, in other words, the resistance value of the scope 24 having the high-speed image sensor 212 with the frame rate of 60 frames per second (fps) (Step S302).

When the determination result of the Step S302 is that the resistance value of the recognition unit 247 is the resistance value of the 60 fps type ("YES" in the Step S302), the optical path switching controller 116 determines whether to switch the optical paths of the light incident on the image sensor 212 at a high speed in time series and outputs the information indicating that the scope 24 is the 60 fps type. Accordingly, the system controller 110 sets the image-processing unit 130 so as to activate the image sensor 212 and control the image sensor 212 to perform the imaging by 60 frames per second (fps) according to the setting values (initial values) read from the parameter storage unit 120. The image-processing unit 130 outputs the control signal according to the setting by the system controller 110 to the image sensor 212 via the control-signal driving circuit 160 and the corresponding signal lines (Step S303). At this time, since the optical-path-switch driving signal is not output from the optical path switching controller 116 to the optical path switching unit 223, the state of the optical path switching unit 223 in which the shielding member 224 is moved to either of the optical paths of the light emitted from the objective lens 222a or the objective lens 222b is maintained. Accordingly, the image sensor 212 transmits the pixels signals representing the objective images generated by capturing the reflection light from the object emitted through the optical path which is not shielded by the optical path switching unit 223 at 60 frames per second (fps) according to the setting from the image-processing unit 130 to the main body 10 via the corresponding signal lines. In other words, the image sensor 212 transmits the pixel signals representing the objective image equivalent to either of the frame captured by the right eye and the frame captured by the left eye to the main body 10 at 60 frames per second (fps). Accordingly, the image-processing unit 130 generates the images (videos) of the object according to the amplified pixel signals amplified by the limiting amplifier circuit 170, and the system controller 110 (more specifically the display controller 113) controls the display apparatus 30 to display the images (videos) of the object generated by the image-processing unit 130 at 60 frames per second (fps).

Subsequently, the user of the endoscopic apparatus 3 inserts the distal endportion of the insertion portion 20 into the specimen while confirming the current objective image (video) displayed on the display apparatus 30. The user of the endoscopic apparatus 3 operates the user interface 190 to instruct the stereo measurement of the object when the distal end portion of the insertion portion 20 reaches the position of the object as the measurement target, in other words, when the object as the measurement target is displayed on the display apparatus 30. Accordingly, the user interface 190 receives the instructions of the stereo measurement by the operations of the user of the endoscopic apparatus 3 and outputs the information representing the received instructions from the user to the system controller 110 (Step S304). The system controller 110 activates the optical path switching controller 116 to start the operations of the stereo photographing in response to the instructions of the stereo measurement by the user of the endoscopic apparatus 3 input from the user interface 190.

When the optical path switching controller 116 starts the operations of the stereo photographing, the optical path switching controller 116 outputs the optical-path-switch driving signals with the high-speed mode current values for switching the optical paths of the light incident on the image sensor 212 in time series to the optical path switching unit 223 via the optical-path-switch driving circuit 180 and the corresponding signal lines every time when the image sensor 212 captures the objective image. Here, the high-speed mode current value refers to the current value necessary for switching the optical paths of the light incident on the image sensor 212 at a high speed during the pixel-signal-read period of the image sensor 212 capturing the objective image by 60 frames per second (fps). Accordingly, the system controller 110 acquires the pair of the images (videos) of the object for the measurement by capturing the reflection light from the object through the optical path which is switched by the optical path switching unit 223 (Step S305). Each processing in the Step S305 is same as the processing of the Step S104 for switching the optical paths of the endoscopic apparatus 1 according to the first embodiment shown in FIG. 2 and the processing of the Step S204 for switching the optical paths of the endoscopic apparatus 2 according to the second embodiment shown in FIG. 4. Accordingly, a detailed description of each processing in the Step S305 will be omitted.

Accordingly, in the endoscopic apparatus 3, in the same way as the endoscopic apparatus 1 according to the first embodiment and the endoscopic apparatus 2 according to the second embodiment, the system controller 110 (more specifically the measurement unit 111) can perform the stereo measurement according to the pair of images (videos) generated by the image-processing unit 130. Subsequently, in the endoscopic apparatus 3, in the same way as the endoscopic apparatus 1 according to the first embodiment and the endoscopic apparatus 2 according to the second embodiment, the system controller 110 (more specifically the display controller 113) superimposes the information of the stereo measurement result by the measurement unit 111 on the pair of the images (videos) of the object generated by the image-processing unit 130 and controls the display apparatus 30 to display them.

The optical path switching controller 116 may increase the times of outputting the optical-path-switch driving signals having a high-speed mode current value for switching the optical paths of the light incident on the image sensor 212. Accordingly, in the endoscopic apparatus 3, the image-processing unit 130 can generate multiple pairs of the images (videos) of the object for the stereo measurement to improve the precision of the stereo measurement by the measurement unit 111.

On the other hand, when the determination result of the Step S302 is that the scope 24 is not the 60 fps type ("NO" in the Step S302), the optical path switching controller 116 determines whether the resistance value of the detected recognition unit 247 is the resistance value of the 30 fps type, that is, whether the resistance value of the detected recognition unit 247 is the resistance value of the scope 24 having the low-speed image sensor 212 with the frame rate of 30 frames per second (fps) (Step S306).

When the determination result of the Step S306 is that the resistance value of the detected recognition unit 247 is the resistance value of the 30 fps type ("YES" in the Step S306), the optical path switching controller 116 determines whether to switch the optical paths of the light incident on the image sensor 212 at a low speed in time series and outputs the information indicating that the scope 24 is the 30 fps type. Accordingly, the system controller 110 sets the image-processing unit 130 so as to activate the image sensor 212 and control the image sensor 212 to perform the imaging by 30 frames per second (fps) according to the setting values (initial values) read from the parameter storage unit 120. The image-processing unit 130 outputs the control signal according to the setting by the system controller 110 to the image sensor 212 via the control-signal driving circuit 160 and the corresponding signal lines (Step S307). At this time, since the optical-path-switch driving signal is not output from the optical path switching controller 116 to the optical path switching unit 223, the state of the optical path switching unit 223 in which the shielding member 224 is moved to either of the optical paths of the light emitted from the objective lens 222a or the objective lens 222b is maintained. Accordingly, the image sensor 212 transmits the pixels signals representing the objective images generated by capturing the reflection light from the object emitted through the optical path which is not shielded by the optical path switching unit 223 at 30 frames per second (fps) according to the setting from the image-processing unit 130 to the main body 10 via the corresponding signal lines. In other words, the image sensor 212 transmits the pixel signals representing the objective images including the frame equivalent to the frame captured by the right eye and the frame equivalent to the frame captured by the left eye to the main body 10 at 30 frames per second (fps). Accordingly, the image-processing unit 130 generates the images (videos) of the object according to the amplified pixel signals amplified by the limiting amplifier circuit 170, and the system controller 110 (more specifically the display controller 113) controls the display apparatus 30 to display the images (videos) of the object generated by the image-processing unit 130 at 30 frames per second (fps).

Subsequently, the user of the endoscopic apparatus 3 inserts the distal endportion of the insertion portion 20 into the specimen while confirming the current objective image (video) displayed on the display apparatus 30. The user of the endoscopic apparatus 3 operates the user interface 190 to instruct the stereo measurement of the object when the distal end portion of the insertion portion 20 reaches the position of the object as the measurement target, in other words, when the object as the measurement target is displayed on the display apparatus 30. Accordingly, the user interface 190 receives the instructions of the stereo measurement by the operations of the user of the endoscopic apparatus 3 and outputs the information representing the received instructions from the user to the system controller 110 (Step S304). The system controller 110 activates the optical path switching controller 116 to start the operations of the stereo photographing in response to the instructions of the stereo measurement by the user of the endoscopic apparatus 3 input from the user interface 190.

When the optical path switching controller 116 starts the operations of the stereo photographing, the optical path switching controller 116 outputs the optical-path-switch driving signals with the low-speed mode current values for switching the optical paths of the light incident on the image sensor 212 in time series to the optical path switching unit 223 via the optical-path-switch driving circuit 180 and the corresponding signal lines every time when the image sensor 212 captures the objective image. Here, the low-speed mode current value refers to the current value necessary for switching the optical paths of the light incident on the image sensor 212 at a low speed during the pixel-signal-read period of the image sensor 212 capturing the objective image by 30 frames per second (fps). Accordingly, the system controller 110 acquires the pair of the images (videos) of the object for the measurement by capturing the reflection light from the object through the optical path which is switched by the optical path switching unit 223 (Step S309). Although the frame rate of photographing the object by the image sensor 212 is different, each processing in the Step S309 is same as the processing of the Step S305. Accordingly, a detailed description of each processing in the Step S309 will be omitted.

Accordingly, in the endoscopic apparatus 3, in the same way as the endoscopic apparatus 1 according to the first embodiment and the endoscopic apparatus 2 according to the second embodiment, the system controller 110 (more specifically the measurement unit 111) can perform the stereo measurement according to the pair of images (videos) generated by the image-processing unit 130. Subsequently, in the endoscopic apparatus 3, in the same way as the endoscopic apparatus 1 according to the first embodiment and the endoscopic apparatus 2 according to the second embodiment, the system controller 110 (more specifically the display controller 113) superimposes the information of the stereo measurement result by the measurement unit 111 on the pair of the images (videos) of the object generated by the image-processing unit 130 and controls the display apparatus 30 to display them.

The optical path switching controller 116 may increase the times of outputting the optical-path-switch driving signals having a low-speed mode current value for switching the optical paths of the light incident on the image sensor 212. Accordingly, in the endoscopic apparatus 3, the image-processing unit 130 can generate multiple pairs of the images (videos) of the object for the stereo measurement to improve the precision of the stereo measurement by the measurement unit 111.

On the other hand, when the determination result of the Step S306 is that the scope 24 is not the 30 fps type ("No" in the Step S306), the optical path switching controller 116 determines that the stereo measurement in response to the instructions from the user of the endoscopic apparatus 3 cannot be performed in this state. In this case, the optical path switching controller 116 determines that the optical paths through which the light incident on the image sensor 212 cannot be switched in time series, and the optical path switching controller 116 informs the display controller 113 with the state in which the stereo measurement cannot be performed. Accordingly, the display controller 113 controls the display apparatus 30 to display a warning message indicating that the stereo measurement cannot be performed (Step S310). A case in which the resistance value of the recognition unit 247 provided at the scope 24 connected to the main body 10 cannot be determined, and a case in which the frame rate of the image sensor 212 provided at the scope 24 is not the corresponding frame rate for the detection are considered to be the reason why the determination result in Step S306 is "NO". Accordingly, the optical path switching controller 116 may inform the display controller 113 with the information of the reason why the stereo measurement cannot be performed together. In this case, the display controller 113 can control the display apparatus 30 to display the warning including the reason why the stereo measurement cannot be performed.

In the case in which the display apparatus 30 is controlled to display the waning in the Step S310, the system controller 110 does not perform the setting with respect to the image sensor 212 to activate the image sensor 212 for the photographing operations. Accordingly, only the warning is displayed on the display apparatus 30. Thus, in the case in which the user of the endoscopic apparatus 3 confirms the warning displayed on the display apparatus 30, the endoscopic apparatus 3 repeats the processing from Step S302 to Step S310 by turning on the power in the state in which the optical adapter 22 is attached to the distal end side of the scope 24 again after the scope 24 connected to the main body 10 is exchanged.

According to the third embodiment, in the endoscopic apparatus (endoscopic apparatus 3), the information prompting means is the recognition means configured to prompt the recognition information for recognizing the type of the insertion portion (insertion portion 20).

According to the third embodiment, in the endoscopic apparatus 3, the recognition means (recognition unit 247) is configured to prompt the recognition information indicating the type of the image sensor (image sensor 212), and the optical path switching controller (optical path switching controller 116) is configured to output the optical-path-switch driving signal according to the type of the image sensor 212 indicated by the recognition information when it is determined to switch the optical paths.

According to the third embodiment, in the endoscopic apparatus 3, the recognition information indicates the frame rate at which the image sensor 212 captures the first objective image (for example, the objective image equivalent to the image captured by the right eye) and the second objective image (for example, the objective image equivalent to the image captured by the left eye), and the optical path switching controller 116 outputs the optical-path-switch driving signal for switching the optical paths at a relative lower speed when the frame rate of the image sensor 212 indicated by the recognition information is low, than that in the case when the frame rate of the image sensor 212 is high.

According to the third embodiment, in the endoscopic apparatus 3, the optical path switching controller 116 outputs the optical-path-switch driving signal for switching the optical paths with a relative lower current value when the optical paths are switched at a low speed than that in the case when the optical paths are switched at a high speed.

As described above, the endoscopic apparatus 3 according to the third embodiment of the present invention has the recognition unit 247 in the scope 24. Accordingly, the endoscopic apparatus 3 according to the third embodiment of the present invention can recognize the type of the insertion portion 20 (more specifically, the type of the image sensor 212 provided in the scope 24) connected to the main body 10. The endoscopic apparatus 3 according to the third embodiment of the present invention controls the current value of the optical-path-switch driving signal output to the optical path switching unit 223 according to the recognized type of the image sensor 212 to be the necessary current value for switching the optical paths of the light incident on the image sensor 212. Accordingly, the endoscopic apparatus 3 according to the third embodiment of the present invention can switch the optical paths of the light incident on the image sensor 212 at the suitable speed according to the frame rate at which the image sensor captures the objective image. The endoscopic apparatus 3 according to the third embodiment of the present invention, in the case when the frame rate of capturing the objective image by the image sensor included in the scope is low (frame rate of 30 frames per second described in the third embodiment), the consumption power of the optical path switching unit 223 for moving (sliding) the shielding member 224 during the stereo measurement can be reduced.

In the endoscopic apparatus 3 according to the third embodiment of the present invention, the situation in which the frame rate of the image sensor 212 becomes a different frame rate by changing the insertion portion 20 (more specifically, the scope 24) connected to the main body, is described. However, the change of the frame rate of the image sensor 212 is not limited to the situation of changing the image sensor 212 itself as described above, and it is possible to change (switch) the frame rate by changing the setting regarding the imaging operations of the image sensor 212. In this case, in the endoscopic apparatus 3 according to the third embodiment of the present invention, the optical path switching controller 116 is configured to control the current value of the optical-path-switch driving signal output to the optical path switching unit 223 to be the necessary current value for switching the optical paths of the light incident on the image sensor 212 whose frame rate is changed (switched), according to the information regarding the frame rate of the image sensor 212 included in the information of the control signal acquired from the image-processing unit 130.

Fourth Embodiment

Figure 7:
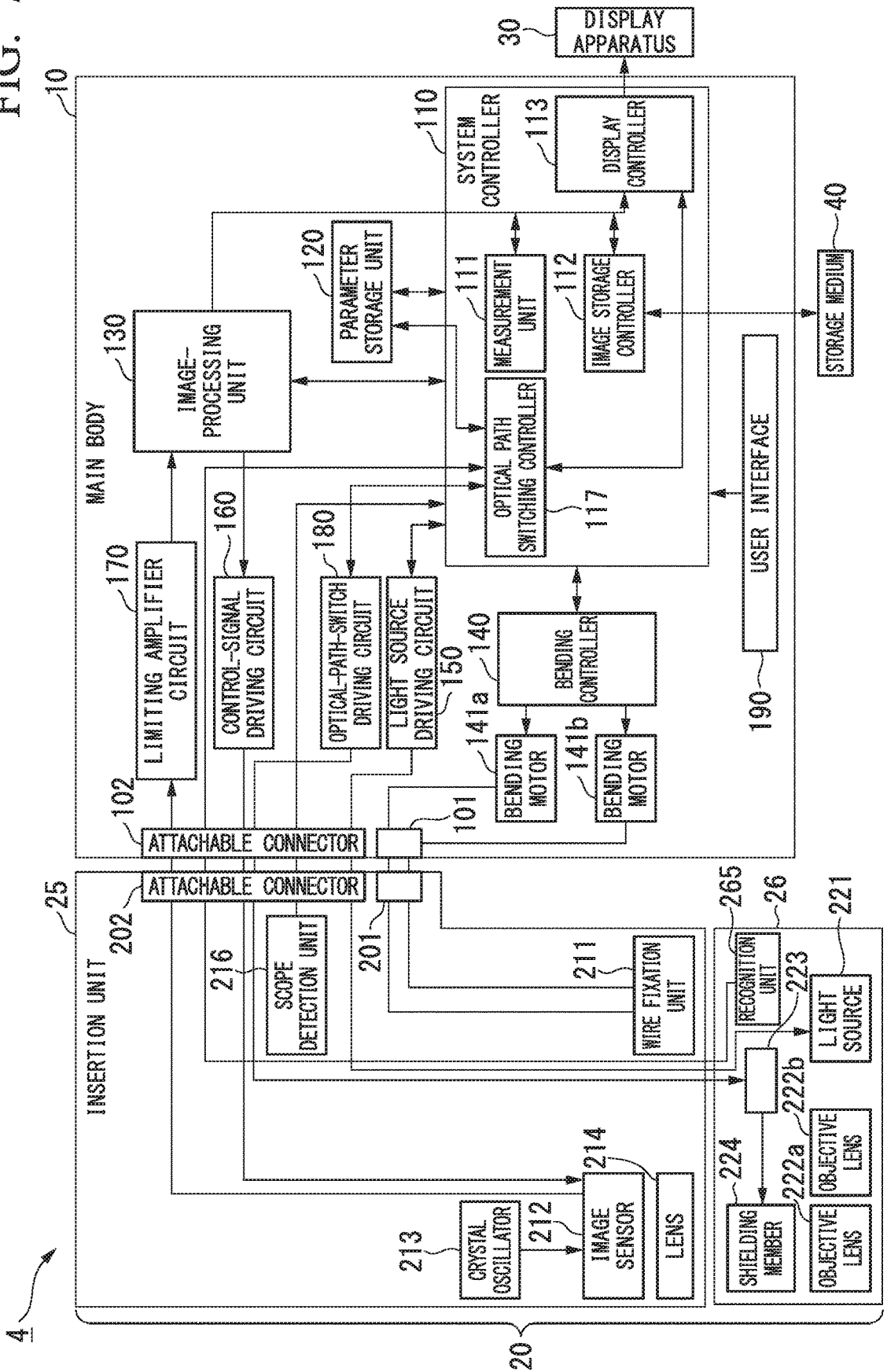
FIG. 7 is a block diagram showing a configuration of an endoscopic apparatus according to a fourth embodiment of the present invention.

Next, a fourth embodiment of the present invention will be described. An endoscopic apparatus according to the fourth embodiment will also be described as an industrial endoscopic apparatus. FIG. 7 is a block diagram showing a configuration of the endoscopic apparatus according to the fourth embodiment of the present invention. In the same way as the endoscopic apparatus 1 according to the first embodiment to the endoscopic apparatus 3 according to the third embodiment, the endoscopic apparatus 4 shown in FIG. 7 has the main body 10 and the elongated insertion portion 20. In the endoscopic apparatus 4, in the same way as the endoscopic apparatus 1 according to the first embodiment to the endoscopic apparatus 3 according to the third embodiment, the main body 10 is connected to the display apparatus 30 and the storage medium 40.

In the same way as the endoscopic apparatus 1 according to the first embodiment to the endoscopic apparatus 3 according to the third embodiment, in the endoscopic apparatus 4, the distal end portion of the flexible insertion portion 20 which has the extending shape in the longitudinal direction along the predetermined central axis is inserted into the specimen so as to display the captured images (videos) of the object on the display apparatus 30 and store the data of the objective image into the storage medium 40.

The main body 10 has the system controller 110, the parameter storage unit 120, the image-processing unit 130, the bending controller 140, two bending motors 141a, 141b, the light source driving circuit 150, the control-signal driving circuit 160, the limiting amplifier circuit 170, the optical-path-switch driving circuit 180, the user interface 190, the wire connection mechanism 101, and the attachable connector 102. The system controller 110 has the measurement unit 111, the image storage controller 112, the display controller 113, and an optical path switching controller 117.

The insertion portion 20 includes a scope 25 having a flexible cord and an optical adapter 26 attachable to and removable from the distal end side of the scope 25. The scope 24 is configured to have the wire fixation unit 211, the image sensor 212, the crystal oscillator 213, the lens 214, the scope detection unit 216, the wire connection mechanism 201, and the attachable connector 202. The optical adapter 206 includes the light source 221, two objective lens 222a, 222b, the optical path switching unit 223, the shielding member 224, and a recognition unit 265. In the scope 25, the wire fixation unit 211, the image sensor 212, the crystal oscillator 213, and the lens 214 are disposed at the distal end side thereof to which the optical adapter 26 is attached. In the description below, the distal end side of the scope 25 at which the image sensor 212 and the like are disposed and the optical adapter 26 attached to the distal end side of the scope 25 are described as the distal end portion of the insertion portion 20.

The endoscopic apparatus 4 has the scope 25 instead of the scope 21 configuring the insertion portion 20 in the endoscopic apparatus 1 according to the first embodiment, the scope 23 configuring the insertion portion 20 in the endoscopic apparatus 2 according to the second embodiment, and the scope 24 configuring the insertion portion 20 in the endoscopic apparatus 3 according to the third embodiment. In the endoscopic apparatus 4, the temperature sensor 215 included in the scope 21 configuring the insertion portion 20 in the endoscopic apparatus 1 according to the first embodiment, the acceleration sensor 235 included in the scope 23 configuring the insertion portion 20 in the endoscopic apparatus 2 according to the second embodiment, and the recognition unit 247 included in the scope 24 configuring the insertion portion 20 of the endoscopic apparatus 3 according to the third embodiment are removed. In the endoscopic apparatus 4, the optical adapter 22 attached to the distal end side of the scope in each of the endoscopic apparatus 1 according to the first embodiment to the endoscopic apparatus 3 according to the third embodiment is replaced with the optical adapter 26. In the endoscopic apparatus 4, the optical adapter 26 attached to the distal end side of the scope 25 configuring the insertion portion 20 has the recognition unit 265. In the endoscopic apparatus 4, the optical path switching controller 114 of the system controller 110 included in the main body 10 of the endoscopic apparatus 1 according to the first embodiment, the optical path switching controller 115 of the system controller 110 included in the main body 10 of the endoscopic apparatus 2 according to the second embodiment, and the optical path switching controller 116 of the system controller 110 included in the main body 10 of the endoscopic apparatus 3 according to the third embodiment are replaced with the optical path switching controller 117. The endoscopic apparatus 4 is configured to control the switching of the optical paths of the light incident on the image sensor according to a type of the optical adapter 26 indicated by the recognition unit 265.

Other configuration elements included in the endoscopic apparatus 4 are same with the configuration elements included in the endoscopic apparatus 1 according to the first embodiment to the endoscopic apparatus 3 according to the third embodiment. Accordingly, in the description below, among the configuration elements of the endoscopic apparatus 4, the configuration elements same with those included in the endoscopic apparatus 1 according to the first embodiment to the endoscopic apparatus 3 according to the third embodiment will be designated to same numeral references, and a detailed description of each configuration element will be omitted. In the description below, only the configuration elements of the endoscopic apparatus 4 different from those of the endoscopic apparatus 1 according to the first embodiment to the endoscopic apparatus 3 according to the third embodiment will be described.

The scope 25 is configured to transmit the pixel signal indicating the objective image generated by imaging the reflection light from the object inside the specimen input from the optical adapter 26, wherein the scope 25 is inserted into the specimen from the distal end portion in the state in which the optical adapter 26 is attached to the distal end side thereof.

The optical adapter 26 is an optical adapter configured to make the light of the objective image inside the specimen to be incident on the image sensor 212 disposed at the distal end side of the scope 25. In the same way as the optical adapter 22 attached to the distal end side of each scope of the endoscopic apparatus 1 according to the first embodiment to the endoscopic apparatus 3 according to the third embodiment, the optical adapter 26 has two objective lens 222a, 222b, and the optical adapter 26 is configured to switch the optical paths of the reflection light incident on the image sensor 212 from the object by using the optical path switching unit 223 to move (slide) the shielding member 224.

The recognition unit 265 is a recognition means configured to prompt information for recognizing the type (function and performance) of the optical adapter 26 included in the insertion portion 20. The recognition unit 265 is configured to at least prompt the information for recognizing the combination of each of the objective lens 222a and the objective lens 222b provided in the optical adapter 26. For example, the recognition unit 265 is configured by a resistance element having an exclusive predetermined fixed resistance value corresponding to each type of the optical adapter 26, that is, each combination of the objective lens 222a and the objective lens 222b provided in the optical adapter 26. The configuration of the recognition unit 265 is not limited to the configuration of using the resistance element described above, for example, the recognition unit 265 may be configured by various memories such as a ROM, an EPROM, a flash memory and the like.

The optical adapter 26 has various types such as the optical adapter 26 configured to measure the object inside the specimen, the optical adapter 26 configured to observe the object inside the specimen, and the like. In each optical adapter, the combination of the objective lens 222a and the objective lens 222b is different. For example, in the case in which one of the objective lens 222a, 222b is the optical lens equivalent to the right eye and the other is the optical lens equivalent to the left eye, in the same way as the optical adapter 22, the optical adapter 26 is configured as the stereo measurement adapter used in the stereo photographing for the stereo measurement of the object inside the specimen by the endoscopic apparatus 4. For example, in the case in which one of the objective lens 222a, 222b is a far-point optical lens and the other is a near-point optical lens, the optical adapter 26 is a bifocal adapter configured to observe the object inside the specimen by switching the focal lengths in the endoscopic apparatus 4. For example, in the case in which one of the objective lens 222a, 222b is a direct-view optical lens and the other is a side-view optical lens, the optical adapter 26 is a direct-side-switchable adapter configured to observe the object inside the specimen by switching the observation direction with respect to the object. Furthermore, in the case in which one of the objective lens 222a, 222b is a telescope optical lens and the other is a wide-angle optical lens, the optical adapter 26 is a tele-wide-switchable adapter configured to observe the object inside the specimen by switching the optical magnifications.

In the endoscopic apparatus 4, the measurement and the observation of the object inside the specimen are performed by the configuration of the insertion portion 20, that is, by the configuration of the optical adapter 26 attached to the distal end portion of the scope 25. Accordingly, in the endoscopic apparatus 4, the system controller 110 is configured to control the photographing of the object in response to the instructions input by the operations of the user of the endoscopic apparatus 4 with respect to the user interface 190. More specifically, in the case in which the measurement instruction is input by the user of the endoscopic apparatus 4 and the stereo measurement adapter is attached to the distal end portion of the scope 25, in the same way as the endoscopic apparatus 1 according to the first embodiment to the endoscopic apparatus 3 according to the third embodiment, the system, controller 110 controls the stereo photographing of the object according to the input measurement instruction. In the stereo measurement by the endoscopic apparatus 4, in the same way as the stereo measurement by the endoscopic apparatus 1 according to the first embodiment to the endoscopic apparatus 3 according to the third embodiment, the system controller 110 switches the optical paths of the reflection light from the object and incident on the image sensor 212 in time series. For example, in the case in which the switching instruction is input from the user of the endoscopic apparatus 4 when either of the bifocal adapter, the direct-side-switchable adapter, or the tele-wide-switchable adapter is attached to the distal end portion of the scope 25, the system controller 110 switches the objective lens 222 for emitting the reflection light from the object to the image sensor 212 according to the input switching instruction. In other words, the switching of the objective lens 222 in the endoscopic apparatus 4, the system controller 110 switches the optical paths of the reflection light from the object to be incident on the image sensor 212 every time when the switching instruction from the user of the endoscopic apparatus 4 is input. In the endoscopic apparatus 4, instead of the optical path switching controller 114 included in the system controller 110 of the endoscopic apparatus 1 according to the first embodiment, the optical path switching controller 115 included in the system controller 110 of the endoscopic apparatus 2 according to the second embodiment, and the optical path switching controller 116 included in the system, controller 110 of the endoscopic apparatus 3 according to the third embodiment, the optical path switching controller 117 included in the system controller 110 is configured to control the switching of the optical paths of the light incident on the image sensor 212.

The optical path switching controller 117 is configured to output the optical-path-switch driving signal to the optical path switching unit 223, wherein the optical-path-switch driving signal is used for controlling the speed and timing of the switching of the optical paths of the light emitted from the optical path switching unit 223 disposed at the optical adapter 26 to the image sensor 212 according to the type of the optical adapter 26 attached to the distal end portion of the insertion portion 20 (more specifically, the distal end side of the scope 25). In other words, the optical-path-switch driving signal is used for controlling the speed and the timing of moving (sliding) the shielding member 224 by the optical path switching unit 223. Accordingly, the optical path switching controller 117 is configured to recognize the type of the optical adapter 26 by recognizing the recognition unit 265 provided in the optical adapter 26. For example, in the case in which the recognition unit 265 is configured by the resistance element having the predetermined fixed resistance value, the optical path switching controller 117 is configured to recognize the type of the optical adapter 26 attached to the distal end portion of the scope 25 by determining the voltage value indicating the resistance value of the recognition unit 265. For example, in a case in which the recognition unit 265 is configured by the memory, the optical path switching controller 117 is configured to recognize the type of the scope 26 attached to the distal end portion of the scope 25 by reading information (data) indicating the type of the optical adapter 26 stored in the recognition unit 265. This is because the necessary speed and timing for switching the optical paths of the light incident on the image sensor 212 varies due to the type of the optical adapter 26 attached to the distal end portion of the scope 25.

In the case in which the stereo measurement adapter is attached to the distal end portion of the scope 25, in the same way as the optical path switching controller 114, the optical path switching controller 117 outputs the optical-path-switch driving signal for switching the optical paths of the light incident on the image sensor 212 to the optical path switching unit 223 at a timing synchronized with the capturing timing of the objective image by the image sensor 212 according to the information of the control signal acquired from the image-processing unit 130. On the other hand, in the case in which the optical adapter excluding the stereo measurement adapter is attached to the distal end portion of the scope 25, the optical path switching controller 117 outputs the optical-path-switch driving signal for switching the optical paths of the light incident on the image sensor to the optical path switching unit 223 in response to the switching instruction from the user of the endoscopic apparatus 4. That is, only in the state in which the stereo measurement adapter is attached to the distal end portion of the scope 25, the optical path switching controller 117 outputs the optical-path-switch driving signal to the optical path switching unit 223 during the pixel-signal-read period of the image sensor 212. In other words, in the state in which the optical adapter excluding the stereo measurement adapter is attached to the distal end portion of the scope 25, the optical path switching controller 117 outputs the optical-path-switch driving signal to the optical path switching unit 223 at an arbitrary timing so as to switch the optical paths at a lower speed than that in the case in which the stereo measurement adapter is attached to the distal end portion of the scope 25. Accordingly, in the endoscopic apparatus 4, in the state in which the optical adapter excluding the stereo measurement adapter is attached to the distal end portion of the scope 25, the consumption power of moving (sliding) the shielding member 24 by the optical path switching unit 223 can be reduced than that in the case in which the stereo measurement adapter is attached to the distal end portion of the scope 25 for performing the stereo measurement. In the endoscopic apparatus 4, in the same way as the endoscopic apparatus 1 according to the first embodiment to the endoscopic apparatus 3 according to the third embodiment, since the insertion portion 20 (more specifically the scope 25) is extremely long, in the same way as the optical path switching controller 114, the optical path switching controller 115, and the optical path switching controller 116, the optical path switching controller 117 outputs the optical-path-switch driving signal for the optical path switching unit 223 to the optical-path-switch driving circuit 180. Accordingly, the optical path switching unit 223 can cause the reflection light from the object and incident on whole of the imaging region of the image sensor 212 to be switched to the reflection light from the object and transmitted through either of the optical paths of the objective lens 222a or the objective lens 222b indicated by the optical-path-switch driving signal at the timing synchronized with the image sensor 212.

In the endoscopic apparatus 4, in the same way as the endoscopic apparatus 1 according to the first embodiment to the endoscopic apparatus 3 according to the third embodiment, the configuration of switching the optical paths of the reflection light from the object and incident on the image sensor 212 by the optical path switching unit 223 in the optical adapter 26 attached to the distal end side of the scope 25 is not limited thereto as described above. In other words, in the same way as the endoscopic apparatus 1 according to the first embodiment to the endoscopic apparatus 3 according to the third embodiment, the endoscopic apparatus 4 may be configured such that the optical path switching controller 117 outputs the optical-path-switch control signal to the optical-path-switch driving circuit 180 and the optical-path-switch driving circuit 180 generates the optical-path-switch driving signal for controlling the optical path switching unit 223 to switch the optical paths according to the speed and timing indicated by the optical-path-switch control signal output by the optical path switching controller 117.

In the state in which the optical adapter excluding the stereo measurement adapter is attached to the distal end portion of the scope 25, in the same way as the optical path switching controller 114, the optical path switching controller 117 informs the display controller 113 with that the optical-path-switch driving signal is output to the optical path switching unit 223. Accordingly, in the endoscopic apparatus 4, in the same way as the endoscopic apparatus 1 according to the first embodiment to the endoscopic apparatus 3 according to the third embodiment, the display controller 113 can control the display apparatus 30 to display the images (videos) of a pair, that is, two frames of images (videos) of the object inside the specimen generated by the image-processing unit 130 as the image (video) equivalent to the image captured by the right eye and the image (video) equivalent to the image captured by the left eye.

Next, the control method of the optical path switching in the endoscopic apparatus 4 according to the fourth embodiment will be described. FIG. 8 is a flowchart showing an example of a processing sequence for optical path switching in the endoscopic apparatus 4 according to the fourth embodiment of the present invention. In FIG. 8, the method of recognizing the optical adapter 26 attached to the distal end portion of the scope 25 and the method of controlling the current values of the optical-path-switch driving signals output to the optical path switching unit 223 included in the optical adapter 26 according to the recognized type of the optical adapter 26, which are performed by the optical path switching controller 117 included in the system controller 110 inside the main body 10 are shown. In the description below, the example of configuring the recognition unit 265 by the resistance element having the predetermined fixed resistance value will be described. In the case when the recognition unit 265 is configured by the resistance element, as described above, the optical path switching controller 117 is configured to recognize the type of the optical adapter 26 attached to the distal end portion of the scope 25 by determining the voltage value indicating the resistance value of the recognition unit 265. However, in order to easily and simply describe the processing of switching the optical paths in the endoscopic apparatus 4 according to the fourth embodiment shown in FIG. 8, it will be described that the optical path switching controller 117 determines the resistance value of the recognition unit 265.

The main body 10 is activated when either of the optical adapters 26 is attached to the distal end portion of the scope 25 and the power is on (Step S401). Accordingly, the system controller 110 provided at the main body 10 reads the data of the program and setting values stored in the parameter storage unit 120 so as to activate the optical path switching controller 117 and start the operations of the optical path switching controller 117 corresponding to the read program.

When the operations of the optical path switching controller 117 are started, firstly, the optical path switching controller 117 determines the resistance value of the recognition unit 265 provided in the optical adapter 26 attached to the distal end portion of the scope 25. The optical path switching controller 117 determines whether the detected resistance value of the recognition unit 265 is the resistance value of the resistance value of the stereo measurement adapter (Step S402).

When the determination result of the Step S402 is that the resistance value of the recognition unit 265 is the resistance value of the stereo measurement adapter ("YES" in the Step S402), the optical path switching controller 117 determines whether to switch the optical paths of the light incident on the image sensor 212 at a high speed in time series and outputs the information indicating that the scope 26 is the stereo measurement adapter. Accordingly, the system controller 110 sets the image-processing unit 130 so as to activate the image sensor 212 and control the image sensor 212 to perform the imaging according to the setting values (initial values) read from the parameter storage unit 120. The image-processing unit 130 outputs the control signal according to the setting by the system controller 110 to the image sensor 212 via the control-signal driving circuit 160 and the corresponding signal lines. At this time, since the optical-path-switch driving signal is not output from the optical path switching controller 117 to the optical path switching unit 223, the state of the optical path switching unit 223 in which the shielding member 224 is moved to either of the optical paths of the light emitted from the objective lens 222a or the objective lens 222b is maintained. Accordingly, the image sensor 212 transmits the pixels signals representing the objective images generated by capturing the reflection light from the object emitted through the optical path which is not shielded by the optical path switching unit 223 according to the setting from the image-processing unit 130 to the main body 10 via the corresponding signal lines. In other words, the image sensor 212 transmits the pixel signals representing the objective image equivalent to either of the frame captured by the right eye and the frame captured by the left eye to the main body 10. Accordingly, the image-processing unit 130 generates the images (videos) of the object according to the amplified pixel signals amplified by the limiting amplifier circuit 170, and the system controller 110 (more specifically the display controller 113) controls the display apparatus 30 to display the images (videos) of the object generated by the image-processing unit 130.

Subsequently, the user of the endoscopic apparatus 4 inserts the distal end portion of the insertion portion 20 into the specimen while confirming the current objective image (video) displayed on the display apparatus 30. The user of the endoscopic apparatus 4 operates the user interface 190 to instruct the stereo measurement of the object when the distal end portion of the insertion portion 20 reaches the position of the object as the measurement target, in other words, when the object as the measurement target is displayed on the display apparatus 30. Accordingly, the user interface 190 receives the instructions of the stereo measurement by the operations of the user of the endoscopic apparatus 4 and outputs the information representing the received instructions from the user to the system, controller 110 (Step S403). The system controller 110 activates the optical path switching controller 117 to start the operations of the stereo photographing in response to the instructions of the stereo measurement by the user of the endoscopic apparatus 4 input from the user interface 190.

When the optical path switching controller 117 starts the operations of the stereo photographing, the optical path switching controller 117 outputs the optical-path-switch driving signals with the high-speed mode current values for switching the optical paths of the light incident on the image sensor 212 in time series to the optical path switching unit 223 via the optical-path-switch driving circuit 180 and the corresponding signal lines every time when the image sensor 212 captures the objective image. Here, the high-speed mode current value refers to the current value necessary for switching the optical paths of the light incident on the image sensor 212 during the pixel-signal-read period of each frame in the image sensor 212. Accordingly, the system controller 110 acquires the pair of the images (videos) of the object for the measurement by capturing the reflection light from the object through the optical path which is switched by the optical path switching unit 223 (Step S404). Each processing in the Step S404 is same as the processing of the Step S104 for switching the optical paths of the endoscopic apparatus 1 according to the first embodiment shown in FIG. 2, the processing of the Step S204 for switching the optical paths of the endoscopic apparatus 2 according to the second embodiment shown in FIG. 4, and the processing of the Step S305 or Step S309 for switching the optical paths of the endoscopic apparatus 3 according to the third embodiment shown in FIG. 6. Accordingly, a detailed description of each processing in the Step S404 will be omitted.

Accordingly, in the endoscopic apparatus 4 having the optical adapter 26 as the stereo measurement adapter attached to the distal end portion of the scope 25, in the same way as the endoscopic apparatus 1 according to the first embodiment to the endoscopic apparatus 3 according to the third embodiment, the system controller 110 (more specifically the measurement unit 111) can perform the stereo measurement according to the pair of images (videos) generated by the image-processing unit 130. Subsequently, in the endoscopic apparatus 4 having the optical adapter 26 as the stereo measurement adapter attached to the distal end portion of the scope 25, in the same way as the endoscopic apparatus 1 according to the first embodiment to the endoscopic apparatus 3 according to the third embodiment, the system controller 110 (more specifically the display controller 113) superimposes the information of the stereo measurement result by the measurement unit 111 on the pair of the images (videos) of the object generated by the image-processing unit 130 and controls the display apparatus 30 to display them.

The optical path switching controller 117 may increase the times of outputting the optical-path-switch driving signals having the high-speed mode current value for switching the optical paths of the light incident on the image sensor 212. Accordingly, in the endoscopic apparatus 4, the image-processing unit 130 can generate multiple pairs of the images (videos) of the object for the stereo measurement to improve the precision of the stereo measurement by the measurement unit 111.

On the other hand, when the determination result of the Step S402 is that the detected resistance value of the recognition unit 265 is not the resistance value of the stereo measurement adapter ("NO" in the Step S402), the optical path switching controller 117 determines whether the detected resistance value of the recognition unit 265 is the resistance value of the bifocal adapter (Step S405).

When the determination result of the Step S405 is that the detected resistance value of the recognition unit 265 is the resistance value of the bifocal adapter ("YES" in the Step S405), the optical path switching controller 117 determines whether to switch that the optical paths of the light incident on the image sensor 212 at a low speed and outputs the information indicating that the scope 26 is the bifocal adapter. Accordingly, the system controller 110 sets the image-processing unit 130 so as to activate the image sensor 212 and control the image sensor 212 to perform the imaging according to the setting values (initial values) read from the parameter storage unit 120. The image-processing unit 130 outputs the control signal according to the setting by the system controller 110 to the image sensor 212 via the control-signal driving circuit 160 and the corresponding signal lines. At this time, since the optical-path-switch driving signal is not output from the optical path switching controller 117 to the optical path switching unit 223, the state of the optical path switching unit 223 in which the shielding member 224 is moved to either of the optical paths of the light emitted from the objective lens 222a or the objective lens 222b is maintained. Accordingly, the image sensor 212 transmits the pixels signals representing the objective images generated by capturing the reflection light from the object emitted through the optical path which is not shielded by the optical path switching unit 223 according to the setting from the image-processing unit 130 to the main body 10 via the corresponding signal lines. In other words, the image sensor 212 transmits the pixel signals representing the objective image captured by the focal length at either of the far point or the near point to the main body 10. Accordingly, the image-processing unit 130 generates the images (videos) of the object according to the amplified pixel signals amplified by the limiting amplifier circuit 170, and the system controller 110 (more specifically the display controller 113) controls the display apparatus 30 to display the images (videos) of the object generated by the image-processing unit 130.

Subsequently, the user of the endoscopic apparatus 4 inserts the distal endportion of the insertion portion 20 into the specimen while confirming the current objective image (video) displayed on the display apparatus 30. The user of the endoscopic apparatus 4 operates the user interface 190 to instruct the switching of the focal lengths when the distal end portion of the insertion portion 20 reaches the position of the object as the measurement target, in other words, when the object as the measurement target is displayed on the display apparatus 30. Accordingly, the user interface 190 receives the instructions of changing the focal length by the operations of the user of the endoscopic apparatus 4 and outputs the information representing the received instructions from the user to the system controller 110 (Step S406). The system controller 110 activates the optical path switching controller 117 to start the operations of switching the optical paths in response to the instructions of changing the focal length input by the user of the endoscopic apparatus 4 input from the user interface 190.

When the optical path switching controller 117 starts the operations of switching the optical paths, the optical path switching controller 117 outputs the optical-path-switch driving signals with the low-speed mode current values for switching the optical paths of the light incident on the image sensor 212 to the optical path switching unit 223 via the optical-path-switch driving circuit 180 and the corresponding signal lines. Here, the low-speed mode current value refers to the current value necessary for simply switching the optical paths of the light incident on the image sensor 212, since there is no necessary to synchronize the timing with the frame generated by capturing the objective image by the image sensor, in other words, there is no restriction with respect to the speed of moving (sliding) the shielding member 224 by the optical path switching unit 223. Accordingly, the low-speed mode current value is lower than the high-speed mode current value necessary for switching the optical paths during the pixel-signal-read period of the image sensor 212. Accordingly, the system controller 110 acquires the pair of the images (videos) of the object for observation by capturing the reflection light from the object through the optical path which is switched by the optical path switching unit 223 (Step S407). More specifically, the image sensor 212 transmits the pixel signal representing the objective image generated by capturing the reflection light from the object through the switched optical path by the optical path switching unit 223 to the main body via the corresponding signal lines. In other words, the image sensor 212 transmits the pixel signal representing the objective image captured by the focal length from either of the far point or the near point to the main body 10. The image-processing unit 130 generates the images (videos) of the object according to the amplified pixel signals amplified by the limiting amplifier circuit 170, that is, the images (videos) having the focal length switched to either of the focal length of the far point or the focal length of the near point, and outputs them to the system controller 110.

Accordingly, in the endoscopic apparatus 4 having the optical adapter 26 as the bifocal adapter attached to the distal end portion of the scope 25, the system controller 110 (more specifically, the display controller 113) controls the display apparatus 30 to display the images (videos) of the object captured at the switched focal length and generated by the image-processing unit 130.

On the other hand, when the determination result of the Step S405 is that the detected resistance value of the recognition unit 265 is not the resistance value of the bifocal adapter ("NO" in the Step S405), the optical path switching controller 117 determines whether the detected resistance value of the recognition unit 265 is the resistance value of the direct-side-switchable adapter (Step S408).

When the determination result of the Step S405 is that the detected resistance value of the recognition unit 265 is the resistance value of the direct-side-switchable adapter ("YES" in the Step S408), the optical path switching controller 117 determines whether to switch the optical paths of the light incident on the image sensor 212 at a low speed and outputs the information indicating that the scope 26 is the direct-side-switchable adapter. Accordingly, the system controller 110 sets the image-processing unit 130 so as to activate the image sensor 212 and control the image sensor 212 to perform the imaging according to the setting values (initial values) read from the parameter storage unit 120. Accordingly, in the same way as the Step S405, the image-processing unit 130 generates the images (videos) of the object according to the pixel signal indicating the objective image transmitted from the image sensor 212, and the system controller 110 (more specifically, the display controller 113) controls the display apparatus 30 to display the images (videos) generated by the image-processing unit 130. Here, the images (videos) generated by the image-processing unit 130 refer to the images (videos) generated by capturing the reflection light from the object transmitted through the optical path from either of the objective lens 222a or the objective lens 222b to the image sensor 212, that is, the images (videos) captured by the image sensor 212 in either of the direct-view direction or the side-view direction.

Subsequently, the user of the endoscopic apparatus 4 inserts the distal endportion of the insertion portion 20 into the specimen while confirming the current objective image (video) displayed on the display apparatus 30. The user of the endoscopic apparatus 4 operates the user interface 190 to instruct the switching of the observation directions when the distal end portion of the insertion portion 20 reaches the position of the object as the measurement target, in other words, when the object as the measurement target is displayed on the display apparatus 30. Accordingly, the user interface 190 receives the instructions of changing the observation directions by the operations of the user of the endoscopic apparatus 4 and outputs the information representing the received instructions from the user to the system controller 110 (Step S409). The system controller 110 activates the optical path switching controller 117 to start the operations of switching the optical paths in response to the instructions of changing the observation direction input by the user of the endoscopic apparatus 4 input from the user interface 190.

When the optical path switching controller 117 starts the operations of switching the optical paths, in the same way as Step S407, the optical path switching controller 117 outputs the optical-path-switch driving signals with the low-speed mode current values for switching the optical paths of the light incident on the image sensor 212 to the optical path switching unit 223 via the optical-path-switch driving circuit 180 and the corresponding signal lines. Accordingly, the system controller 110 acquires the pair of the images (videos) of the object for observation by capturing the reflection light from the object through the optical path which is switched by the optical path switching unit 223 (Step S410). In Step S410, since a different optical adapter 26 is used, the system controller 110 acquires the images (videos) of the object for the observation by capturing in either of the direct-view direction or the side-view direction; however, each processing in Step S410 is the same as the processing in Step S407. Accordingly, a detailed description of the processing in Step S410 will be omitted.

Accordingly, in the endoscopic apparatus 4 having the optical adapter 26 as the direct-side-switchable adapter attached to the distal end portion of the scope 25, the system controller 110 (more specifically, the display controller 113) controls the display apparatus 30 to display the images (videos) of the object captured in the switched observation direction and generated by the image-processing unit 130.

On the other hand, when the determination result of the Step S408 is that the detected resistance value of the recognition unit 265 is not the resistance of the direct-side-switchable adapter ("No" in the Step S408), the optical path switching controller 117 determines that the measurement and observation in response to the instructions from the user of the endoscopic apparatus 4 cannot be performed in this state. In this case, the optical path switching controller 117 determines that the optical paths of the light incident on the image sensor 212 cannot be switched, and the optical path switching controller 117 informs the display controller 113 with the state in which the measurement and the observation cannot be performed. Accordingly, the display controller 113 controls the display apparatus 30 to display a warning message indicating that the measurement and observation cannot be performed (Step S411). A case in which the resistance value of the recognition unit 265 provided at the scope 26 attached to the distal end portion of the scope 25 cannot be determined, and a case in which the optical adapter attached to the distal end portion of the scope 25 is not the corresponding optical adapter are considered to be the reason why the determination result in Step S408 is "NO". Accordingly, the optical path switching controller 117 may inform the display controller 113 with the information of the reason why the measurement and observation cannot be performed together. In this case, the display controller 113 can control the display apparatus 30 to display the warning including the reason why the measurement and observation cannot be performed.

In the case in which the display apparatus 30 is controlled to display the waning in the Step S411, the system controller 110 does not perform the setting with respect to the image sensor 212 to activate the image sensor 212 for the photographing operations. Accordingly, only the warning is displayed on the display apparatus 30. Thus, in the case in which the user of the endoscopic apparatus 4 confirms the warning displayed on the display apparatus 30, the endoscopic apparatus 4 repeats the processing from Step S402 to Step S411 by turning on the power in the state in which the optical adapter 26 is attached to the distal end portion of the scope 25 again after the scope 26 attached to the distal end portion of the scope 25 is exchanged.

According to the fourth embodiment, in the endoscopic apparatus (endoscopic apparatus 4), the recognition means (recognition unit 265) is configured to prompt the recognition information indicating the type of the objective optical system combined by the first objective optical system and the second objective optical system (combination of objective lens 222a and objective lens 222b), and the optical path switching controller (optical path switching controller 117) is configured to output the optical-path-switch driving signal according to the type of the objective optical system indicated by the recognition information when it is determined to switch the optical paths.

According to the fourth embodiment, when the type of the objective optical system indicated by the recognition information is the observation optical system, the optical path switching controller 117 outputs the optical-path-switch driving signal for switching the optical path at a lower speed than that in the case of the measurement optical system configured to be able to switch the optical paths at a high speed to measure the object.

As described above, the endoscopic apparatus 4 according to the fourth embodiment of the present invention, the optical adapter 26 has the recognition unit 265. Accordingly, the endoscopic apparatus 4 according to the fourth embodiment of the present invention can recognize the type of the optical adapter 26 attached to the distal end portion of the scope 25, that is, the various combinations of the objective lens 222a and the objective lens 222b included in the optical adapter 26. The endoscopic apparatus 4 according to the fourth embodiment of the present invention controls the current value of the optical-path-switch driving signal output to the optical path switching unit 223 to the necessary value for switching the optical paths of the light incident on the image sensor 212 according to the recognized type of the optical adapter 26. Accordingly, the endoscopic apparatus 4 according to the fourth embodiment of the present invention can switch the optical paths of the light incident on the image sensor 212 at speeds suitable to perform the measurement and the observation by the optical adapter 26 attached to the distal end portion of the scope 25. In the endoscopic apparatus 4 according to the fourth embodiment of the present invention, in the case in which the optical adapter 26 attached to the distal end portion of the scope 25 is the optical adapter 26 (including the bifocal adapter, the direct-side-switchable adapter, and the tele-wide-switchable adapter) for performing the observation of the object, the consumption power of the optical path switching unit 223 to move (slide) the shielding member 224.

As described above, according to the embodiments of the present invention, in the endoscopic apparatus having the optical adapter including two objective lens configured to switch the optical paths of the light of the objective image incident on the image sensor, wherein the optical adapter is attached to the distal end side of the scope configuring the insertion portion, the optical path switching controller is configured to determine whether to switch the optical paths of the light incident on the image sensor according to the state of the insertion portion. According to the embodiments of the present invention, the speed and the timing of switching the optical paths of the light incident on the image sensor are controlled according to the state of the insertion portion determined by the optical path switching controller. At this time, according to the embodiments of the present invention, the switching of the optical paths of the light of the objective image incident on the image sensor is stopped when the state of the insertion portion determined by the optical path switching controller is not suitable to perform the measurement and observation of the object inside the specimen. According to the embodiments of the present invention, when there is no restriction in the speed of switching the optical paths of the light of the objective image incident on the image sensor according to the state of the insertion portion determined by the optical path switching controller, the switching of the optical paths is controlled to be performed at a low speed. Therefore, according to the embodiments of the present invention, the unnecessary consumption power of the mechanism operated for switching the optical paths of the light of the objective image incident on the image sensor can be reduced. According to the embodiments of the present invention, unnecessary heat generation can be suppressed by reducing the consumption power of the mechanism for switching the optical paths so as to reduce the possibility of damaging the mechanism for switching the optical paths itself and the configuration elements of the insertion portion (for example the image sensor 212) disposed in the vicinity of the mechanism for switching the optical paths.

In each embodiment, the configuration of the endoscopic apparatus having the insertion portion configured by the scope and the optical adapter is described. In other words, according to the embodiments, the endoscopic apparatus having the configuration such that the objective optical system configuring the insertion portion can be separated from the distal end side of the insertion portion is described. However, the configuration of the insertion portion configuring the endoscopic apparatus is not limited to the configuration described in each embodiment, and the scope and the optical adapter may be integrated. In other words, the insertion portion of the endoscopic apparatus may be configured such that the objective optical system is incorporated in the distal end side of the insertion portion.

According to the embodiments, configurations of the optical path switching controller using variable configuration elements to determine the states of corresponding insertion portion are described such as the temperature sensor 215 provided in the scope 21 according to the first embodiment, the acceleration sensor 235 provided in the scope 23 according to the second embodiment, the recognition unit 247 provided in the scope 24 according to the third embodiment, and the recognition unit 265 provided in the optical adapter 26 according to the fourth embodiment. However, such configuration elements configured to determine the states of the insertion portions respectively are not exclusively provided in the corresponding endoscopic apparatus, and various configuration elements may be simultaneously included in the endoscopic apparatus. In this case, in the endoscopic apparatus, the functions and the processing according to the configuration elements described in the embodiments can be realized simultaneously.

In the embodiments, it is described that the length of the scope configuring the insertion portion is extremely long. However, the point of view of each embodiment is that the endoscopic apparatus is not limited to the configuration having the insertion portion with an extremely long scope, and the configuration can be applied regardless of the length of the scope configuring the insertion portion. In this case, the same effect can be achieved. In the endoscopic apparatus configured to have an insertion portion with a short scope, it is considerable to remove the configuration elements suitable for the endoscopic apparatus having the insertion portion with a long scope (more specifically, the light source driving circuit 150, the control signal driving circuit 160, the limiting amplifier circuit 170, and the optical-path-switch driving circuit 180). In this case, the operations, the processing, and the control methods of the endoscopic apparatus can be easily considered according to the description in each of the embodiments. Accordingly, a detailed description of the endoscopic apparatus configured to have the insertion portion with a short scope based on the principle approach of the present invention will be omitted.

According to the embodiments, the endoscopic apparatus of the present invention is described to be the industrial endoscopic apparatus. However, the configuration and the point of view of each embodiment is not limited to the industrial endoscopic apparatus. For example, the configuration according to each embodiment can be applied in a medical endoscopic apparatus. Accordingly, in the medical endoscopic apparatus, the same effect can be achieved comparing with the industrial endoscopic apparatus described in each embodiment of the present invention.

For example, the functions and the processing of the endoscopic apparatus such as the main body 10 and a part of the main body 10, the system controller 110 provided in the main body 10, and the optical path switching controller 114 may be performed by recording the program for realizing the functions and the processing of the endoscopic apparatus in a computer-readable recording medium and causing a computer system to read and execute the program recorded in the recording medium. Here, the computer system refers to a system including an operating system (OS) and hardware such as peripheral devices. In the case of using the WWW (World Wide Web), the "computer system" also includes the homepage providing environment (or displaying environment). The "computer-readable recording medium" refers to the writable non-transitory memory such as a flexible disk, a magneto-optical disk, a Read-only memory, and a flash memory, a removable medium such as CD-ROM, and a storage device such as a hard disk drive disposed inside the computer system.

Furthermore, the "computer-readable recording medium" also includes the volatile memory (for example, Dynamic Random Access Memory, DRAM) for maintaining the program for a certain period disposed inside the computer system as the server and the client in a case that the program is transferred through a network such as the internet and a communication line such as the telephone line. The program, may be transferred from the computer system storing the program in the memory device to another computer system via a transmission medium or transmission wave in the transmission medium. The "transmission medium" for transmitting the program refers to a medium having the information transmission function, for example, a network such as the internet (communication network) and a communication line such as the telephone line. The program may be a program for realizing part of the functions described above. Furthermore, the functions described above may be combined with the program already recorded in the computer system to be realized, that is, the functions may be a difference file (difference program).

The embodiments of the invention have been described above with reference to the drawings, but specific structures of the invention are not limited to the embodiments and may include various modifications without departing from the scope of the invention. The invention is not limited to the above-mentioned embodiments and is limited only by the accompanying claims.

What is claimed is:

1. An endoscopic apparatus, comprising:
an insertion portion configured to extend in a longitudinal direction, the insertion portion having a sensor configured to identify a state of the insertion portion;
a first objective optical system disposed in the distal end portion and configured to form a first objective image of an object on an imaging region by transmitting light from the object through a first optical path;
a second objective optical system disposed in the distal end portion and configured to form a second objective image of the object on the imaging region by transmitting the light from the object through a second optical path;
an optical path switch configured to switch an optical path of the light from the object to either of the first optical path or the second optical path such that either of the first objective image or the second objective image is formed on the imaging region;
an image sensor configured to capture the first objective image and the second objective image formed on the imaging region; and
an optical path switching controller configured to:
determine whether to switch the optical path according to the identified state of the insertion portion; and
control the optical path switch to switch the optical paths of the light from the object according to the identified state of the insertion portion.

2. The endoscopic apparatus according to claim 1,
wherein the optical path switching controller is configured to determine whether to switch the optical path according to the information identified by the sensor,
wherein the optical path switching controller is configured to control the optical path switch to switch the optical paths when the optical path switching controller determines to switch the optical paths, and
wherein the optical path switching controller is configured to control the optical path switch not to switch the optical paths when the optical path switching controller determines not to switch the optical paths.

3. The endoscopic apparatus according to claim 2,
wherein the optical path switching controller is configured to generate and output an optical-path-switch driving signal to the optical path switch when the optical path switching controller determines to switch the optical path, the optical-path-switch driving signal being used for driving the optical path switch to switch the optical path, and
wherein the optical path switching controller is configured to not output the optical-path-switch driving signal when the optical path switching controller determines not to switch the optical path.

4. The endoscopic apparatus according to claim 3, wherein the sensor is configured to acquire measurement information of the insertion portion.

5. The endoscopic apparatus according to claim 4,
wherein the measurement information is a temperature of the distal end portion of the insertion portion, and
wherein the optical path switching controller is configured to:
determine to switch the optical path when the measured temperature of the distal end portion is lower than a predetermined temperature threshold value, and
determine not to switch the optical path when the measured temperature of the distal end portion is equal to or higher than the temperature threshold value.

6. The endoscopic apparatus according to claim 4,
wherein the measurement information is a movement amount of the distal end portion of the insertion portion, and
wherein the optical path switching controller is configured to:
determine to switch the optical path when the measured movement amount of the distal end portion is less than a predetermined movement amount threshold value, and
determine not to switch the optical path when the measured movement amount of the distal end portion is equal to or more than the movement amount threshold value.

7. The endoscopic apparatus according to claim 3, wherein the sensor is an identification means configured to identify a type of the insertion portion.

8. The endoscopic apparatus according to claim 7,
wherein the identification means is configured to identify a type of the image sensor, and
wherein the optical path switching controller is configured to output the optical-path-switch driving signal in response to the identified type of the image sensor when the optical path switching controller determines to switch the optical path.

9. The endoscopic apparatus according to claim 8,
wherein the identification means is configured to identify a frame rate by which the image sensor captures the first objective image and the second objective image,
wherein the optical path switching controller is configured to output the optical-path-switch driving signal at a first speed when the frame rate is identified as a first frame rate, and
wherein the optical path switching controller is configured to output the optical-path-switch driving signal at a second speed slower than the first speed when the frame rate is identified as a second frame rate is lower than the first frame rate.

10. The endoscopic apparatus according to claim 7,
wherein the identification means is configured to identify a type of an objective optical system formed by a combination of the first objective optical system and the second objective optical system, and
wherein the optical path switching controller is configured to output the optical-path-switch driving signal corresponding to the identified type of the objective optical system when the optical path switching controller determines to switch the optical path.

11. The endoscopic apparatus according to claim 10,
wherein the optical path switching controller is configured to output the optical-path-switch driving signal at a first speed when the optical system is identified as a measurement optical system configured to measure the object by switching the optical path at a second speed, and
wherein the optical path switching controller is configured to output the optical-path-switch driving signal at a third speed slower than the first speed when the optical system is identified as an observation optical system configured to observe the object by switching the optical path at a fourth speed slower than the second speed.

12. The endoscopic apparatus according to claim 3, wherein the optical path switch is configured to switch the optical path by sliding a shielding member due to a magnetic field generated according to a current polarity of the optical-path-switch driving signal to shield either of the first optical path or the second optical path.

13. The endoscopic apparatus according to claim 12,
wherein the optical path switching controller is configured to output the optical-path-switch driving signal with a first current value when the optical path is switched at a first speed, and
wherein the optical path switching controller is configured to output the optical-path-switch driving signal with a second current value lower than the first current value when the optical path is switched at a second speed slower than the first speed.

14. The endoscopic apparatus according to claim 1,
wherein the insertion portion is configured by a scope having a flexible cord and an optical adapter attachable to and removable from a distal end side of the scope,
wherein the first objective optical system, the second objective optical system, and the optical path switch are disposed inside the optical adapter, and
wherein the image sensor is disposed at the distal end side of the scope.

15. The endoscopic apparatus according to claim 2, wherein the optical path switching controller is configured to inform a determination result when the optical path switching controller determines that the optical path cannot be switched.

16. A control method of an endoscopic apparatus, the endoscopic apparatus having:
an insertion portion configured to extend in a longitudinal direction, the insertion portion having a sensor configured to identify a state of the insertion portion;
a first objective optical system disposed in the distal end portion and configured to form a first objective image of an object on an imaging region by transmitting light from the object through a first optical path;
a second objective optical system disposed in the distal end portion and configured to form a second objective image of the object on the imaging region by transmitting the light from the object through a second optical path;
an optical path switch configured to switch an optical path of the light from the object to either of the first optical path or the second optical path such that either of the first objective image or the second objective image is formed on the imaging region;
an image sensor configured to capture the first objective image and the second objective image formed on the imaging region; and
an optical path switching controller configured to control the optical path switch to switch the optical path of the light from the object according to a state of the insertion portion, the control method of an endoscopic apparatus comprising:
determining whether to switch the optical path according to the identified state of the insertion portion;
controlling the optical path switch according to the identified state of the insertion portion to switch the optical path when it is determined to switch the optical path; and
controlling the optical path switch according to the identified state of the insertion portion not to switch the optical path when it is determined that the optical path cannot be switched.

17. A non-transitory computer-readable medium storing a control program for causing a computer included in an optical path switching controller of an endoscopic apparatus to execute, the endoscopic apparatus having:
an insertion portion configured to extend in a longitudinal direction, the insertion portion having a sensor configured to identify a state of the insertion portion;
a first objective optical system disposed in the distal end portion and configured to form a first objective image of an object on an imaging region by transmitting light from the object through a first optical path;
a second objective optical system disposed in the distal end portion and configured to form a second objective image of the object on the imaging region by transmitting the light from the object through a second optical path;
an optical path switch configured to switch an optical path of the light from the object to either of the first optical path or the second optical path such that either of the first objective image or the second objective image is formed on the imaging region;
an image sensor configured to capture the first objective image and the second objective image formed on the imaging region; and
the optical path switching controller configured to control the optical path switch to switch the optical path of the light from the object according to a state of the insertion portion,
the control program causes the computer included in the optical path switching controller to execute:
a processing of determining whether to switch the optical path according to the identified state of the insertion portion;
a processing of controlling the optical path switch to switch the optical path when it is determined to switch the optical path; and
a processing of controlling the optical path switch not to switch the optical when it is determined that the optical path cannot be switched.

18. The endoscopic apparatus according to claim 1, wherein the controller is further configured to display the state of the insertion portion identified by the sensor.

* * * * *